United States Patent
Sugawa et al.

(10) Patent No.: US 11,590,907 B2
(45) Date of Patent: Feb. 28, 2023

(54) IN-VEHICLE NETWORK SYSTEM, ELECTRONIC CONTROL UNIT, AND GATEWAY DEVICE

(71) Applicant: HITACHI AUTOMOTIVE SYSTEMS, LTD., Hitachinaka (JP)

(72) Inventors: Jun Sugawa, Tokyo (JP); Kazuyoshi Serizawa, Hitachinaka (JP); Shuhei Kaneko, Hitachinaka (JP); Kenichi Osada, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 244 days.

(21) Appl. No.: 16/962,445

(22) PCT Filed: Dec. 21, 2018

(86) PCT No.: PCT/JP2018/047312
§ 371 (c)(1),
(2) Date: Jul. 15, 2020

(87) PCT Pub. No.: WO2019/150843
PCT Pub. Date: Aug. 8, 2019

(65) Prior Publication Data
US 2021/0061194 A1 Mar. 4, 2021

(30) Foreign Application Priority Data
Jan. 31, 2018 (JP) .............................. JP2018-014801

(51) Int. Cl.
*B60R 16/023* (2006.01)
*H04L 12/66* (2006.01)
(Continued)

(52) U.S. Cl.
CPC ............ *B60R 16/023* (2013.01); *H04L 12/66* (2013.01); *H04L 67/12* (2013.01); *H04Q 9/00* (2013.01)

(58) Field of Classification Search
CPC .. H04Q 9/00; H04Q 2209/00; H04Q 2209/10; H04Q 2209/40; H04Q 2209/43;
(Continued)

(56) References Cited

U.S. PATENT DOCUMENTS 9,461,846 B2 * 10/2016 Joslin ....................... H04Q 9/00
10,523,683 B2 * 12/2019 Ando .................. H04L 63/0281
(Continued)

FOREIGN PATENT DOCUMENTS

CN 104199351 A * 12/2014 .......... G05B 19/042
JP 2002-308054 A 10/2002
(Continued)

OTHER PUBLICATIONS

International Search Report and English Translation, PCT/JP2018/047312 dated Feb. 12, 2019 (2 pgs.).
(Continued)

*Primary Examiner* — Franklin D Balseca
(74) *Attorney, Agent, or Firm* — Volpe Koenig

(57) ABSTRACT

An in-vehicle network system which is mounted on a vehicle includes an electronic control unit, a plurality of gateway devices, and a plurality of sensor devices that collects ambient information which is information around the vehicle. Each of the sensor devices communicates with the electronic control unit via at least one gateway device. The electronic control unit includes a mode management unit that determines one operation mode in a plurality of operation modes associated with the sensor device to be operated, and a sleep instruction control unit that specifies a gateway device which is the gateway device, in which the
(Continued)

connected sensor device does not operate, and does not need to relay sensor information, based on the operation mode determined by the mode management unit, and transitions the gateway device having no need to relay the sensor information to a low power state in which a processing capacity is lowered.

12 Claims, 20 Drawing Sheets

(51) Int. Cl.
*H04L 67/12* (2022.01)
*H04Q 9/00* (2006.01)

(58) Field of Classification Search
CPC .......... H04Q 2209/70; H04Q 2209/80; H04Q 2209/84; H04L 12/66; H04L 67/12; B60R 16/023
See application file for complete search history.

(56) References Cited

U.S. PATENT DOCUMENTS

| | | | |
|---|---|---|---|
| 10,941,955 B2 * | 3/2021 | Herai | B60H 1/0065 |
| 2012/0320793 A1 | 12/2012 | Balbierer et al. | |
| 2016/0278017 A1 | 9/2016 | Koike | |

FOREIGN PATENT DOCUMENTS

| | | |
|---|---|---|
| JP | 2011-004276 A | 6/2011 |
| JP | 5701354 B2 | 4/2015 |
| JP | 2016-124455 A | 7/2016 |

OTHER PUBLICATIONS

Extended European Search Report dated Sep. 3, 2021 for European Patent Application No. 18904374.8.

* cited by examiner

FIG. 5

OPERATION MODE MANAGEMENT TABLE

| | | MODE 0 (NORMAL STATE) | MODE 1 (LOW POWER 1) | MODE 2 (LOW POWER 2) | MODE 3 (LOW POWER 3) | MODE 4 (LOW POWER 4) | ... |
|---|---|---|---|---|---|---|---|
| - | ECU1 | ○ | ○ | | ○ | ○ | |
| - | ECU2 | ○ | | ○ | ○ | ○ | |
| FRONT | SENSOR 1A | ○ | ○ | | ○ | ○ | |
| FRONT | SENSOR 1B | ○ | ○ | | ○ | ○ | |
| FRONT | SENSOR 2A | ○ | | ○ | ○ | | |
| FRONT | SENSOR 2B | ○ | | ○ | ○ | | |
| REAR | SENSOR 1C | ○ | ○ | | ○ | ○ | |
| REAR | SENSOR 1D | ○ | ○ | | ○ | ○ | |
| REAR | SENSOR 2C | ○ | | ○ | | | |
| REAR | SENSOR 2D | ○ | | ○ | | | |

FIG. 6

| COMMUNICATION ROUTE MANAGEMENT TABLE | | |
|---|---|---|
| TRANSMISSION SOURCE | TRANSMISSION DESTINATION | GATEWAY TO PASS |
| 1A | ECU1 | 1F |
| 1A | ECU2 | 1F, 2F |
| 1B | ECU1 | 1F |
| 1C | ECU1 | 1R, 1F |
| 1D | ECU1 | 1R, 1F |
| 2A | ECU2 | 2F |
| 2B | ECU2 | 2F |
| 2C | ECU2 | 2R, 2F |
| 2D | ECU2 | 2R, 2F |
| ... | | |
| 2X | ECU2 | 2R, 1R, 1F, 2F |
| ECU1 | ECU2 | 1F, 2F |
| ECU2 | ECU1 | |

FIG. 11

OPERATION MODE MANAGEMENT TABLE

| | | MODE 0 (NORMAL STATE) | MODE 1 (LOW POWER 1) | MODE 2 (LOW POWER 2) | MODE 3 (LOW POWER 3) | MODE 4 (LOW POWER 4) | ... |
|---|---|---|---|---|---|---|---|
| - | ADECU1 | ○ | ○ | | ○ | ○ | |
| - | ADECU2 | ○ | | ○ | ○ | ○ | |
| FRONT | SENSOR 1A | ○(T0_1a) | ○(T1_1a) | | ○(T3_1a) | ○(T4_1a) | |
| | SENSOR 1B | ○(T0_1b) | ○(T1_1b) | | ○(T3_1b) | ○(T4_1b) | |
| | SENSOR 2A | ○(T0_2a) | | ○(T1_2a) | ○(T3_2a) | | |
| | SENSOR 2B | ○(T0_2b) | | ○(T1_2b) | ○(T3_2b) | | |
| REAR | SENSOR 1C | ○(T0_1c) | ○(T1_1c) | | ○(T3_1c) | ○(T4_1c) | |
| | SENSOR 1D | ○(T0_1d) | ○(T1_1d) | | ○(T3_1d) | ○(T4_1d) | |
| | SENSOR 2C | ○(T0_2c) | | ○(T1_2c) | | | |
| | SENSOR 2D | ○(T0_2d) | | ○(T1_2d) | | | |

FIG. 13

OPERATION MODE MANAGEMENT TABLE

|  |  | MODE 0 (NORMAL STATE) | MODE 1 (LOW POWER 1) | MODE 2 (LOW POWER 2) | MODE 3 (LOW POWER 3) | MODE 4 (LOW POWER 4) | ... |
|---|---|---|---|---|---|---|---|
| - | ADECU1 | ○ | ○ |  | ○ | ○ |  |
| - | ADECU2 | ○ |  | ○ | ○ | ○ |  |
| FRONT | SENSOR 1A | ○ (DUPLICATE 0) | ○ (DUPLICATE 1) |  | ○ (DUPLICATE 1) | ○ (DUPLICATE 1) |  |
|  | SENSOR 1B | ○ (DUPLICATE 0) | ○ (DUPLICATE 1) |  | ○ (DUPLICATE 1) | ○ (DUPLICATE 1) |  |
|  | SENSOR 2A | ○ (DUPLICATE 0) |  | ○ (DUPLICATE 1) | ○ (DUPLICATE 1) |  |  |
|  | SENSOR 2B | ○ (DUPLICATE 0) |  | ○ (DUPLICATE 1) | ○ (DUPLICATE 1) |  |  |
| REAR | SENSOR 1C | ○ (DUPLICATE 0) | ○ (DUPLICATE 1) |  | ○ (DUPLICATE 2) | ○ (DUPLICATE 1) |  |
|  | SENSOR 1D | ○ (DUPLICATE 0) | ○ (DUPLICATE 1) |  | ○ (DUPLICATE 2) | ○ (DUPLICATE 1) |  |
|  | SENSOR 2C | ○ (DUPLICATE 0) |  | ○ (DUPLICATE 1) |  |  |  |
|  | SENSOR 2D | ○ (DUPLICATE 0) |  | ○ (DUPLICATE 1) |  |  |  |

IN-VEHICLE NETWORK SYSTEM, ELECTRONIC CONTROL UNIT, AND GATEWAY DEVICE

TECHNICAL FIELD

The present invention relates to an in-vehicle network system, an electronic control unit, and a gateway device.

BACKGROUND ART

In automobiles, the number of sensors mounted on vehicles and the types of sensors are increasing with the advancement of autonomous driving. In addition, in order to increase the reliability of automatic driving, it is considered to provide redundant electronic control units for automatic driving and to provide redundant sensors with different types of sensors, and it is considered that the number of sensors and the types of sensors will increase. Further, the amount of data to be transmitted by the sensor tends to increase as the performance of the sensor improves. In this way, as the number of sensors and the types of sensors increase, the wiring length and the number of wirings between many sensors and actuators and electronic control units increases. In an in-vehicle network system, in order to simplify the wiring, it is considered that sensors, actuators, and electronic control units are concentrated at a gateway, and the gateway is shifted to a network configuration connected to a backbone network. In addition, as the number of sensors, the type of sensors, and the amount of communication per sensor increase in this way, the bandwidth of the in-vehicle network increases, so there is concern that the power consumption of the in-vehicle network may increase. Further, it is desired to reduce the power consumption of the in-vehicle network from the viewpoint of reducing the environmental load and improving the fuel efficiency of the vehicle.

PTL 1 discloses a vehicle control device which includes a sensing device that detects an object around a vehicle, an electronic control unit that collects measurement results of the sensing device, and gives an instruction to switch the operation state of the sensing device as necessary, and a bus-type network for transmitting and receiving a signal between the sensing device and the electronic control unit. The sensing device is configured to take an operation state in a normal state where a normal operation is performed and an operation state in a power saving state where power consumption is reduced. The electronic control unit includes a sensing device operation state management unit that manages the operation state of the sensing device. The sensing device operation state management unit includes a surrounding environment recognition processing unit which recognizes a surrounding environment of a vehicle from the sensing result acquired from the sensing device, and an operation state switching processing unit which determines whether to shift the sensing device operating in the normal state to the power saving state or whether to shift the sensing device operating in the power saving state to the normal state based on the recognition result of the surrounding environment recognition processing unit, and instructs the sensing device to switch the operation state via the bus-type network based on the determination. The surrounding environment recognition processing unit calculates information of a position or a speed of the object existing around the vehicle or both from the measurement result of the sensing device, and recognizes a relative relation between the vehicle and the object existing around the vehicle based on the calculation result. When the relative position and the relative speed of the object existing around the vehicle exceed the respective predetermined thresholds, the operation state switching processing unit determines that the sensing device in the power saving state needs to be switched to the normal state, and instructs the sensing device to switch the operation state to the normal state via the bus-type network. When the number of objects existing around the vehicle exceeds a predetermined threshold, the operation state switching processing unit determines that the sensing device in the power saving state needs to be switched to the normal state, and instructs the sensing device to switch the operation state to the normal state via the bus-type network.

CITATION LIST

Patent Literature

PTL 1: JP 5701354 B2

SUMMARY OF INVENTION

Technical Problem

In the invention described in PTL 1, reduction of power consumption is not sufficient.

Solution to Problem

An in-vehicle network system according to a first aspect of the invention is mounted on a vehicle which includes an electronic control unit, a plurality of gateway devices, and a plurality of sensor devices that collects ambient information which is information around the vehicle. Each of the sensor devices communicates with the electronic control unit via at least one gateway device. The electronic control unit includes a mode management unit that determines one operation mode in a plurality of operation modes associated with the sensor device to be operated, and a sleep instruction control unit that specifies a gateway device which is the gateway device, in which the connected sensor device does not operate, and does not need to relay information from a sensor, based on the operation mode determined by the mode management unit, and transitions the gateway device having no need to relay the sensor information to a low power state in which a processing capacity is lowered. The gateway device is connected to the plurality of sensor devices which do not operate in any one of the same operation modes without passing through the other gateway devices.

An electronic control unit according to a second aspect of the invention communicates with a plurality of gateway devices and a plurality of sensor devices that collect ambient information that is information around a vehicle, and is mounted in the vehicle. The electronic control unit includes a mode management unit that determines one of a plurality of operation modes associated with the sensor device to be operated, and a sleep instruction control unit that specifies a gateway device having no need to relay information from a sensor, which is the gateway device in which the connected sensor device does not operate, based on the operation mode determined by the mode management unit, and transitions the gateway device not needing to relay the sensor information to a low power state where a processing capacity is lowered.

A gateway device according to a third aspect of the invention relays information from an electronic control unit that determines one of a plurality of operation modes associated with a sensor device to be operated, and a plurality of the sensor devices that collect ambient information which is information around a vehicle. The gateway device is connected without passing through the plurality of sensor devices and other gateway devices that do not operate in any one of the same operation modes.

Advantageous Effects of Invention

According to the invention, power consumption can be reduced.

BRIEF DESCRIPTION OF DRAWINGS

FIG. 5 is a diagram illustrating an example of an operation mode management table.

FIG. 6 is a diagram illustrating an example of a communication route management table.

FIG. 11 is a diagram illustrating an example of an operation mode management table in a second embodiment.

FIG. 13 is a diagram illustrating an example of an operation mode management table in a third embodiment.

DESCRIPTION OF EMBODIMENTS

First Embodiment

A first embodiment of an in-vehicle network system S according to the invention will be described below with reference to FIGS. 1 to 9.

Definition of Terms

In this embodiment, a state in which power consumption of any component of the device is reduced is called a "low power state" or a "sleep state", and a state in which power consumption is not reduced is called a "normal state". The processing capacity in the low power state is lower than that in the normal state. The low power state is, for example, a state in which no power is supplied to a certain component to stop the operation, or a state in which the operation is slowed to reduce the power consumption. In this embodiment, a combination of an ECU and a sensor to be operated is called an operation mode.

(Configuration of In-Vehicle Network System S)

Figure 1:
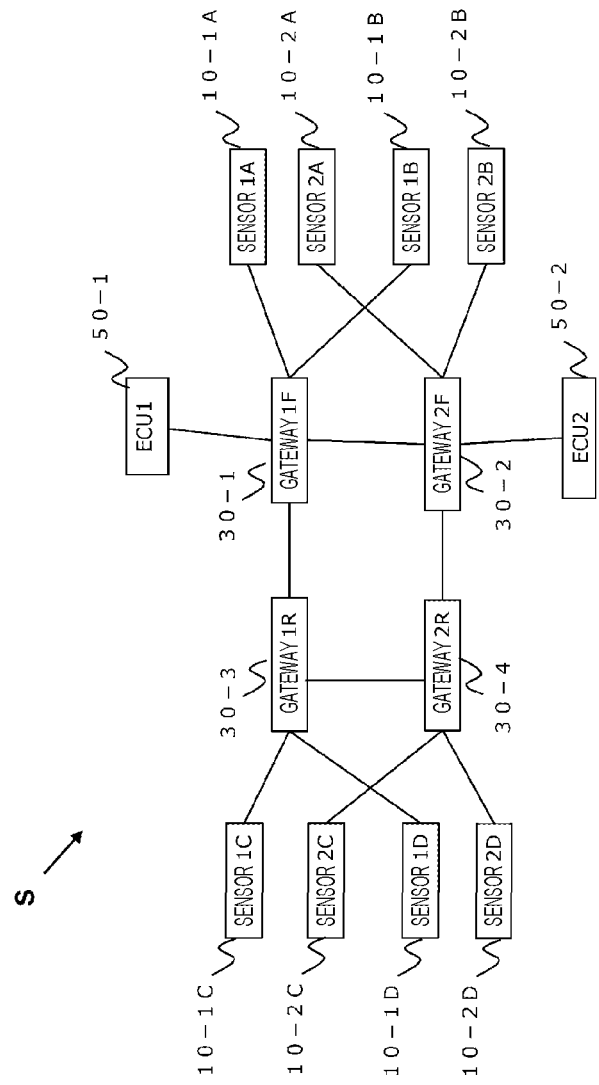
FIG. 1 is a configuration diagram of an in-vehicle network system S mounted on a vehicle 100.

FIG. 1 is a configuration diagram of an in-vehicle network system S mounted on a vehicle 100.

The in-vehicle network system S includes an ECU 50-1 and an ECU 50-2, a gateway 30-1F, a gateway 30-1R, a gateway 30-2F, a gateway 30-2R, a sensor 10-1A to a sensor 10-1D, and a sensor 10-2A to a sensor 10-2D. In the following, each of the above-described ECUs will be referred to as an ECU device 50 when not particularly distinguished, and each of the above-described gateways will be referred to as a gateway device 30 when not particularly distinguished, and each of the above-described sensors will be referred to as a sensor device 10 when not particularly distinguished. In the following, the sensor 10-1A may be referred to as "sensor 1A" by omitting "10-", which is the common symbol to each sensor device 10. Similarly, the gateway 30-1R may be referred to as "gateway 1R" and the ECU 50-1 may be referred to as "ECU 1".

The sensor device 10 and the ECU device 50 are classified into two groups. The sensors 10-1A to 10-1D and the ECU 50-1 belong to a first group, and the sensors 10-2A to 10-2D and the ECU 50-2 belong to a second group. The gateway 30-1F and the gateway 30-1R are connected so as to concentrate the sensor device 10 of group 1, and the gateway 30-2F and the gateway 30-2R are connected so as to concentrate the sensor device 10 of group 2.

In FIG. 1, the sensor 10-1A, the sensor 10-1B, and the ECU 50-1 are directly connected to the gateway 30-1F, and the sensor 10-2A, the sensor 10-2B, and the ECU 50-2 are directly connected to the gateway 30-2F. The sensor 10-1C and the sensor 10-1D are directly connected to the gateway 30-1R, and the sensor 10-2C and the sensor 10-2D are directly connected to the gateway 30-2R. In addition, the configuration that a certain sensor device 10 is directly connected to the gateway device 30 means that the sensor device 10 is connected without interposing another gateway device 30 therebetween.

The gateway devices 30 are connected in a ring shape. Specifically, the gateway 30-1R and the gateway 30-1F are connected, the gateway 30-1F and the gateway 30-2F are connected, the gateway 30-2F and the gateway 30-2R are connected, and the gateway 30-2R and the gateway 30-1R are connected. Since the gateway devices 30 are connected to each other in a ring shape, there is a bypass route even if one of the gateways fails and communication becomes impossible, so a wire-saving and highly reliable network is realized.

These two groups are classified according to whether they are used in the operation mode described later. For example, in one operation mode, only the first group of equipment is used, and in another certain mode, only the second group of equipment is used. In addition, each sensor device 10 collects information around the vehicle 100. Since the installation location is limited by the information to be collected, the installation position of each sensor device 10 in the vehicle 100 is limited. For example, when the sensor 10-1A is a camera that photographs the left front of the vehicle 100, the sensor 10-1A is installed in the left front of the vehicle 100.

The gateway device 30 is arranged in consideration of the area of the vehicle 100. For example, in two gateway devices 30 belonging to the same first group, the gateway 30-1F is arranged in the front of the vehicle 100 and the gateway 30-1R is arranged in the rear of the vehicle 100. This makes it possible to connect the sensor device 10 and the gateway device 30 separately for each group without lengthening the wiring of the in-vehicle network.

Further, by determining the grouping based on the degenerate operation, even if any of: the ECU 1 or the ECU 2, or the gateway device 30 that connects the ECU 1 and the sensor device 10 of the first group, or the gateway device that connects the ECU 2 and the sensor device 10 of the second group is broken, the degenerate operation is possible. In this case, the sensor device 10 used in the degenerate operation mainly operated by the ECU 50-1 is the first group, and the sensor device 10 used in the degenerated operation mainly operated by the ECU 50-2 is the second group. Further, in this case, there is an advantage that the in-vehicle network has high reliability.

(Communication)

Communication of the in-vehicle network system S will be described. The sensor information acquired by each sensor device 10 is transmitted to the gateway device 30 in a format according to a predetermined communication standard. These pieces of sensor information are transmitted to the ECU 1 or the ECU 2 via one or more gateway devices 30. However, the sensor information may be transmitted to both the ECU 1 and the ECU 2.

When the sensor belonging to the first group is not used, the gateway 30-1F and the gateway 30-1R having a role of transmitting the sensor information of the sensor belonging to the first group to the ECU can be temporarily stopped in their operations, that is, the sensor can be in a sleep mode if not having another role. Similarly, when the sensor belonging to the second group is not used, the gateway 30-2F and the gateway 30-2R having a role of transmitting the sensor information of the sensor device 10 belonging to the second group to the ECU device 50 can be stopped in their operations, that is, the sensor can be in a sleep mode if not having another role.

Further, the sleep may be performed not on a group basis but on a gateway basis to which the sensor device 10 is connected. For example, when the sensor 10-1C and the sensor 10-2C belonging to the first group are not used, the gateway 30-1R can transition to the sleep state in a case where a gateway 30-1R connected to only the sensor 10-1C and the sensor 10-2C as the sensor device 10 has no other role.

In this way, by connecting the sensor device 10 and the ECU device 50 of different groups to the gateway device 30 so as not to coexist as much as possible, there are the following advantages. That is, when the sensor device 10 and the ECU device 50 are not used for a certain period of time, it is possible to reduce not only the power consumption of the unused sensor device 10 and the unused ECU device 50 but also the power consumption of the gateway device 30 to which they are connected.

In FIG. 1, the in-vehicle network system S includes eight sensor devices 10, four gateway devices 30, and two ECU devices 50, but the configuration of the in-vehicle network system S is not limited to this. For example, in FIG. 1, the gateway devices 30 are connected in a ring type. However, even if the gateways 30-1R and 30-1F are connected, the gateways 30-1F and 30-2F are connected, and the gateways 30-2F and the gateway 30-2R are connected, the sensor device 10 and the ECU device 50 for each group can be separately concentrated.

Although two sensor devices 10 are connected to each gateway device 30 in FIG. 1, the number of sensor devices 10 and ECU devices 50 connected to each gateway device 30 may be different. Further, in FIG. 1, the number of gateway devices 30 that concentrate the first group and the number of gateway devices 30 that concentrate the second group are both two, but they may be different.

(Configuration of Sensor Device 10)

Figure 2:
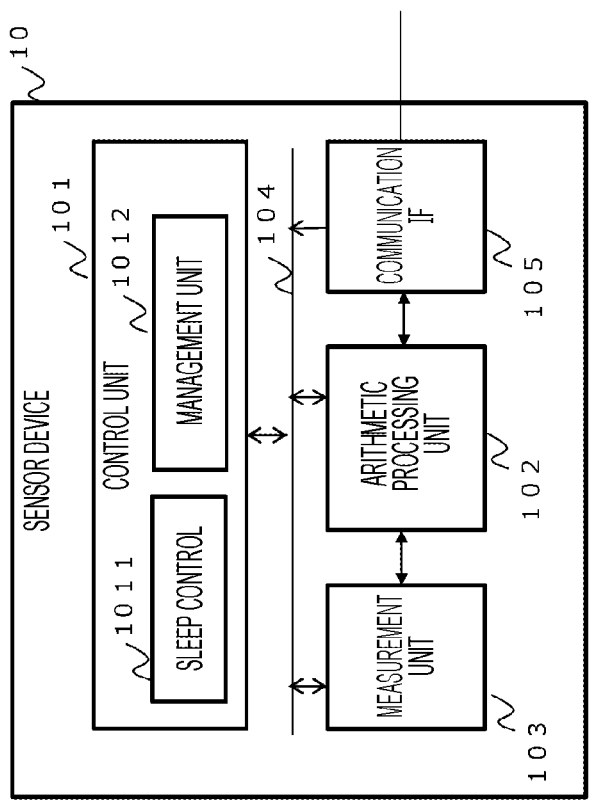
FIG. 2 is a block diagram illustrating a common configuration of a sensor device 10.

FIG. 2 is a block diagram illustrating a common configuration of the sensor device 10. That is, as illustrated in FIG. 1, the in-vehicle network system S includes a plurality of sensors, and their detailed configurations are not necessarily the same, but here, a common configuration of these sensor devices 10 will be described.

The sensor device 10 includes a control unit 101, an arithmetic processing unit 102, a measurement unit 103, and a communication interface (hereinafter, referred to as "communication IF") 105. Hereinafter, the control unit 101, the arithmetic processing unit 102, the measurement unit 103, and the communication IF 105 are collectively referred to as "each component of the sensor device 10". Each component of the sensor device 10 is connected to each other via an internal bus 104, and it is possible to exchange control data with each other.

The control unit 101 and the arithmetic processing unit 102 are integrated circuits for specific applications, that is, ASICs (application specific integrated circuits). However, the control unit 101 and the arithmetic processing unit 102 are configured by a CPU, a ROM, and a RAM, and may be realized by the CPU developing a program stored in the ROM into the RAM and executing the program. Specific functions of the control unit 101 and the arithmetic processing unit 102 will be described later.

The measurement unit 103 senses the surrounding environment of the vehicle at a preset sampling frequency. Then, the measurement unit 103 converts the sensed physical quantity into an electric signal, converts the electric signal into a digital signal, and outputs the digital signal to the arithmetic processing unit 102. The measurement unit 103 is, for example, an image sensor or a millimeter wave sensor.

The arithmetic processing unit 102 performs various arithmetic processing based on the digital signal acquired from the measurement unit 103, stores the arithmetic result (hereinafter, referred to as "ambient information") in a payload unit in a frame format, and outputs the frame to the communication IF 105. The arithmetic processing unit 102 also outputs the received frame to the control unit 101 when the destination described in the header part of the frame input from the communication IF 105 matches the identifier of the device.

The communication IF 105 converts the frame acquired from the arithmetic processing unit 102 into a format conforming to the communication standard, and outputs the frame to the connected gateway device 30. In addition, the signal input from the gateway device 30 is converted into a frame and output to the arithmetic processing unit 102. The standard of the network to which the communication IF 105 is connected is, for example, IEEE 802.3, CAN (registered trademark), CAN-FD, etc. devised for vehicles. Further, although only one communication IF 105 is provided in FIG. 2, a plurality of communication IFs 105 may be provided in order to improve communication reliability.

The communication IF 105 is a physical communication interface, for example, a combination of an RJ45 connector and a control circuit. The control unit 101 and the arithmetic processing unit 102 assume a virtual communication connection port in the process of processing, and this is also called a "communication port" or a "port". The correspondence between the communication port defined by the control unit 101 and the arithmetic processing unit 102 and the communication IF 105 is predetermined. Therefore, for example, when the control unit 101 or the arithmetic processing unit 102 determines a communication port for outputting data, the communication IF 105 for outputting data is also uniquely determined.

The communication IF 105 can transition to the low power state by exchanging an LPS (Low Power Sleep) signal with the gateway device 30 that is a connection destination. Further, when the communication IF 105 receives a WakeUp (hereinafter, "WUP") signal in the low power state, the communication IF 105 transitions from the low power state to the normal state. Further, when the communication IF 105 receives the WUP signal in the low power state, the communication IF 105 activates itself and notifies a sleep control unit 1011 of the reception of the WUP signal via the internal bus 104. Further, when the communication IF 105 receives the LPS signal in the normal state, the communication IF 105 notifies the sleep control unit 1011 of the reception of the LPS signal via the internal bus 104.

The control unit 101 includes a sleep control unit 1011 and a management unit 1012. The sleep control unit 1011 controls the power state of each component of the sensor device 10. For example, when receiving the LPS signal which is a transition command to the low power state from the connected gateway device 30, the sleep control unit 1011 makes each component of the sensor device 10 transition to the low power state and shifts to the sleep state. However, the sleep control unit 1011 may exclude the control unit 101 from the target of transition to the low power state.

The management unit 1012 controls and manages the operations of the measurement unit 103 and the arithmetic processing unit 102. For example, the management unit 1012 issues an instruction to change the sensing cycle to the measurement unit 103, and an instruction to change the operating frequency to the arithmetic processing unit 102. The sleep control unit 1011 and the management unit 1012 may operate in cooperation with each other.

Since the sensor device 10 has the configuration described above, it is possible to bring the communication IF 105, the arithmetic processing unit 102, and the measurement unit 103 into a low power state. Further, it is possible to change from the normal state to the sleep state or from the sleep state to the normal state based on the signal received from the gateway device 30.

(Configuration of Gateway Device 30)

Figure 3:
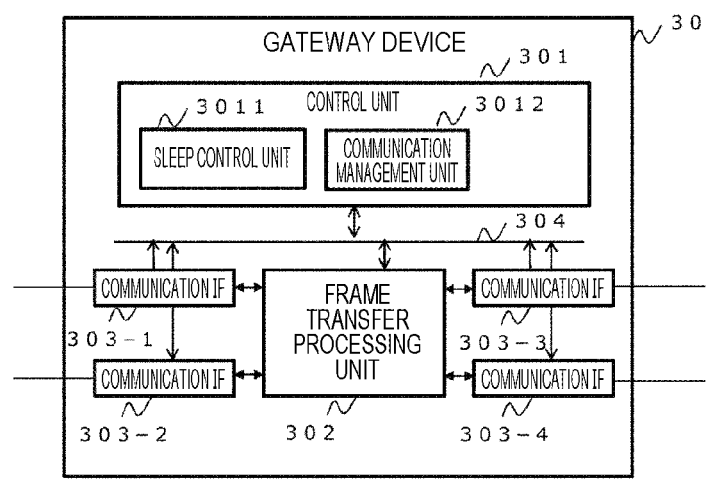
FIG. 3 is a block diagram illustrating a common configuration of a gateway device 30.

FIG. 3 is a block diagram illustrating a common configuration of the gateway device 30. The gateway device 30 includes a control unit 301, a frame transfer processing unit 302, and one or more communication IFs 303. Hereinafter, the control unit 301, the frame transfer processing unit 302, and the communication IF 303 are collectively referred to as "each component of the gateway device 30". Each component of the gateway device 30 is connected to each other via a bus 304, and exchanges control data with each other.

The control unit 301 and the frame transfer processing unit 302 are ASICs. However, the control unit 301 and the frame transfer processing unit 302 may include a CPU, a ROM, and a RAM, and may be realized by the CPU developing a program stored in the ROM into the RAM and executing the program. Specific functions of the control unit 301 and the frame transfer processing unit 302 will be described later.

The communication IF 303 is a physical communication interface, for example, a combination of an RJ45 connector and a control circuit. The control unit 301 and the frame transfer processing unit 302 assume a virtual communication connection port in the process of processing, and this is also called a "communication port" or a "port". The correspondence between the communication port defined by the control unit 301 and the frame transfer processing unit 302 and the communication IF 303 is predetermined. Therefore, for example, when the control unit 301 and the frame transfer processing unit 302 determine the communication port for outputting data, the communication IF 303 for outputting data is also uniquely determined.

The control unit 301 includes a sleep control unit 3011 and a communication management unit 3012. The sleep control unit 3011 controls the power state of each component of the gateway device 30. The sleep control unit 3011 sets each component of the gateway device 30 to a low power state according to a sleep instruction frame received from another ECU. Further, when the gateway device 30 receives the LPS signal via the communication IF 303, the gateway device 30 determines whether the communication IF 303 that has received the LPS signal should be in the low power state.

As described above, when the sensor device 10 receives the LPS signal, it shifts to the sleep state in which the entire device is in the low power state, but the gateway device 30 does not shift to the sleep state even when receiving the LPS signal. Even if the gateway device 30 receives the LPS signal, the gateway device 30 simply makes a transition of the communication IF 303 that has received the LPS signal to the low power state at the maximum.

The communication management unit 3012 manages route information, transfer destination information, band information, priority information, failure information, and the like of frames transferred by the gateway device 30.

Each communication IF 303 communicates with the ECU device 50, the sensor device 10, or another gateway device 30. The communication IF 303 according to this embodiment is a one-to-one connection, and the gateway device 30 includes the communication IFs 303 equal to or more than the number of connected devices. For example, in FIG. 1, the gateway 30-1F is connected to the two sensor devices 10, two gateway devices 30, and one ECU device 50, so the gateway 30-1F includes at least five communication IFs 303.

The communication IF 303 outputs the data received via the network to the frame transfer processing unit 302, and also outputs the data input from the frame transfer processing unit 302 to the network. The communication standard supported by each communication IF 303 is not particularly limited. The communication IF 303 corresponds to, for example, IEEE 802.3, CAN, CAN-FD, etc. devised for vehicles. Also, each communication IF 303 may support different communication standards.

Upon receiving a transition instruction to the low power state from the sleep control unit 3011, the communication IF 303 transmits the LPS signal to the connection destination and transitions from the normal state to the low power state. Upon receiving a transition instruction to the normal state from the sleep control unit 3011, the communication IF 303 transitions from the low power state to the normal state and transmits the WUP signal to the connection destination. The communication IF 303 always accepts the WUP signal even in the low power state, and when receiving the WUP signal from the connection destination, transitions to the normal state and notifies the control unit 301 of the reception of the WUP signal. When the communication IF 303 receives the LPS signal in the normal state, the communication IF 303 notifies the control unit 301 of the reception of the LPS signal.

The frame transfer processing unit 302 sets the frame input from the communication IF 303 as a processing target, determines the communication IF 303 to be output from the destination stored in the header part of the frame, and outputs the frame to the communication IF 303. When the destination stored in the header part of the frame input from the communication IF 303 is the gateway device 30, the frame transfer processing unit 302 outputs the payload of the frame to the control unit 301. When the sleep instruction frame addressed to the gateway device 30 is input from the communication IF 303, the frame transfer processing unit 302 outputs the payload of the sleep instruction frame to the sleep control unit 3011. The frame transfer processing unit 302 has a transfer database and is used to determine an output destination of the input frame. The frame transferred by the frame transfer processing unit 302 also includes a sleep instruction frame.

Each gateway device 30 can make the communication IF 303 and the frame transfer processing unit 302 transition to a low power state. Also, a sleep control method can be determined based on the sleep instruction frame received from the other ECU. Further, the gateway device 30 can prompt the transition to the low power consumption state for the connected sensor device 10 or the ECU by transmitting the LPS signal via the communication IF 303.

(Configuration of ECU Device)

Figure 4:
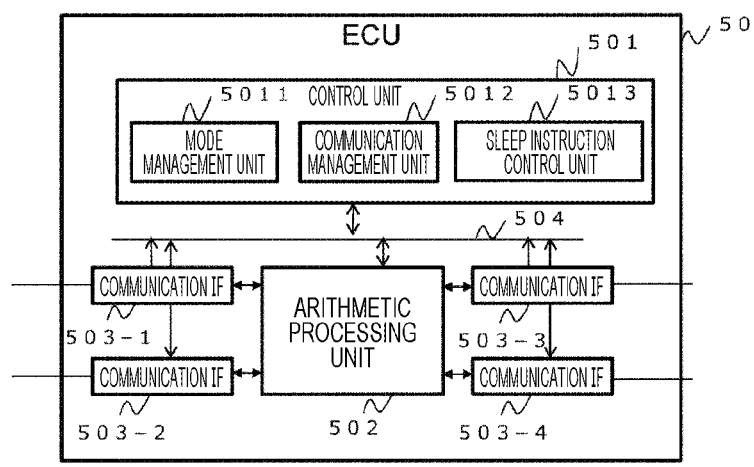
FIG. 4 is a block diagram illustrating a common configuration of an ECU device 50.

FIG. 4 is a block diagram illustrating a common configuration of the ECU device 50. The ECU device 50 includes a control unit 501, an arithmetic processing unit 502, and one or more communication IFs 503. Hereinafter, the control unit 501, the arithmetic processing unit 502, and the communication IF 503 are collectively referred to as "each component of the ECU device 50". Each component of the ECU device 50 is connected to each other via a bus 504, and exchanges control data with each other.

The control unit 501 and the arithmetic processing unit 502 are ASICs. However, the control unit 501 and the arithmetic processing unit 502 are configured by a CPU, a ROM, and a RAM, and may be realized by the CPU developing a program stored in the ROM into the RAM and executing the program. Specific functions of the control unit 501 and the arithmetic processing unit 502 will be described later.

The communication IF 503 is a physical communication interface, for example, a combination of an RJ45 connector and a control circuit. The control unit 501 and the arithmetic processing unit 502 assume a virtual communication connection port in the process of processing, and this is also called a "communication port" or a "port". The correspondence between the communication port defined by the control unit 501 and the arithmetic processing unit 502 and the communication IF 503 is predetermined.

The control unit 501 includes a mode management unit 5011, a communication management unit 5012, and a sleep instruction control unit 5013. The mode management unit 5011 detects the number of peripheral objects, the distance to a vehicle, weather information, etc. detected based on the calculation result of the arithmetic processing unit 502 and the data received from other sensor devices 10 and the ECU device 50, and determines an operation mode.

The communication management unit 5012 manages communication route information, band information, priority information, failure information, and the like in the entire in-vehicle network. The route information has, for example, information about which ECU device 50 the sensor device 10 or the ECU device 50 in the in-vehicle network communicates with, and which gateway device 30 is communicating in which order. The band information manages information such as the amount of data communicated between each sensor device 10 or the ECU device 50 and the other ECU device 50, and the transmission cycle thereof. The priority information manages, for example, a priority value for data communicated between each sensor device 10 or the ECU device 50 and the other ECU device 50. The failure information manages what kind of failure has occurred in which communication section, for example. The information managed by the communication management unit 5012 is used by the sleep instruction control unit 5013.

The sleep instruction control unit 5013 determines a device to be a sleep target and a sleep period based on the operation mode determined by the mode management unit 5011. Then, the sleep instruction frame including the sleep target and the sleep period is issued and transmitted via the arithmetic processing unit 502 and the communication IF 503. The arithmetic processing unit 502 performs a calculation based on the information input from the sensor device 10 or the other ECU device 50 via the communication IF 503. The specific calculation content of the arithmetic processing unit 502 is not particularly limited. The calculation result of the arithmetic processing unit 502 is transmitted to the other ECU via the communication IF 503.

Each communication IF 503 communicates with the other ECU device 50 and the gateway device 30. The communication IF 503 in this embodiment is a one-to-one connection, and the ECU device 50 includes the communication IF 503 equal to or more than the number of connected devices. The communication IF 503 outputs the data received via the network to the arithmetic processing unit 502 and the control unit 501, and outputs the data input from the arithmetic processing unit 502 and the control unit 501 to the network. The communication standard supported by each communication IF 503 is not particularly limited. The communication IF 503 corresponds to, for example, IEEE 802.3, CAN, CAN-FD, etc. devised for vehicles. Also, each communication IF 503 may support different communication standards.

In this way, the ECU device 50 performs a calculation based on the data from the sensor device 10 or the other ECU connected to the in-vehicle network, transmits the calculation result to the other ECU. Further, the ECU device 50 determines an operation mode, and determines the device and the period during which the sleep state transitions based on the determined operation mode. Then, the ECU device 50 transmits the sleep instruction frame to the device that is a sleep target.

(Operation Mode Management Table)

FIG. 5 is a diagram illustrating an example of an operation mode management table stored in the ECU device 50. The operation mode management table illustrates the devices used for each operation mode. In the following, a device used in a certain operation mode may be referred to as a "use target" device, and a device not used may be referred to as a "non-use target" device. The operation mode management table is represented, for example, in a table format as illustrated in FIG. 5, the rows correspond to the respective devices, and the columns correspond to the respective operation modes. However, in FIG. 5, the device ID is described in the leftmost column, and the mode name is described in the uppermost column. A value indicating whether to use the device in each operation mode is input to each element of the table. In FIG. 5, O is filled in when used, and blank when not used.

For example, all devices are used in mode 0. In mode 1, only the first group, that is, the ECU 1 and the sensors 1A to 1D are used. In mode 2, only the second group, that is, the ECU 2 and the sensors 2A to 2D are used. In mode 3, devices other than the sensors 2C and 2D are used. In mode 4, the ECU 1, the ECU 2, and sensors 1A to 1D are used.

The mode management unit 5011 selects a mode as follows, for example. The mode management unit 5011 selects mode 0 when other modes are inappropriate, such as a situation where there are many objects around the vehicle, a situation where the weather is not good and recognition by various sensors is necessary. The mode management unit 5011 selects mode 1 when the automatic driving ECU 2 or the gateway device connected to the automatic driving ECU 2 fails and the automatic driving ECU 1 performs the degenerate operation.

The mode management unit 5011 selects mode 2 when the automatic driving ECU 1 or the gateway connected to the automatic driving ECU 1 fails and the automatic driving ECU 2 performs the degenerate operation. The mode management unit 5011 selects mode 3 when the vehicle is on a highway with relatively few objects to be recognized and there are few objects around the vehicle. The mode management unit 5011 selects mode 4 when the weather is good, the surrounding visibility is good, and recognition is possible without using a plurality of types of sensors.

(Communication Route Management Table)

FIG. 6 is a diagram illustrating an example of a communication route management table provided in the communication management unit 5012 of the ECU 50. The communication route management table is configured by items of a transmission source, a transmission destination, and a gateway device through which the communication is performed, and for a pair of the transmission source and the transmission destination, a list of identifiers of gateway devices through which the communication is performed is described. For example, when the sensor 1A transmits sensor information to the ECU 1, only the gateway 1F is passed. When the sensor 1A transmits to the ECU 2, the gateways 1F and 2F are passed in this order. When the sensor 2X transmits to the ECU 2, the gateway 2R, 1R, 1F, 2F are passed in this order.

The communication management unit 5012 can identify a gateway device to which each sensor or each ECU is connected, and a gateway used for the relay process in each communication by referring to the communication route management table. For example, if there is only one gateway device passing through, it can be determined that both the source terminal and the destination terminal are connected to the gateway device. For example, since only the gateway 1F is the gateway device that passes from the sensor 1A to the ECU 1, it can be determined that both the sensor 1A and the ECU 1 are connected to the gateway 1F.

Further, when there are two gateway devices passing through, it can be determined that the source terminal is connected to the first gateway device and the destination terminal is connected to the second gateway device. Also, if there are three or more gateway devices to pass through, it can be determined that the source terminal is connected to the first gateway device, the destination terminal is connected to the last gateway device, and other gateway devices are used for relaying information. For example, since there are four gateway devices that pass from the sensor 2X to the ECU 2, the gateway 2R, the gateway 1R, the gateway 1F, and the gateway 2F, it can be determined that the sensor 2X is connected to the first gateway device that is the gateway 2R, the ECU 2 is connected to the gateway 2F that is the last gateway device, and the gateway 1R and the gateway 1F are used for relaying information.

(Flowchart of Sleep Instruction Control Unit 5013)

Figure 7:
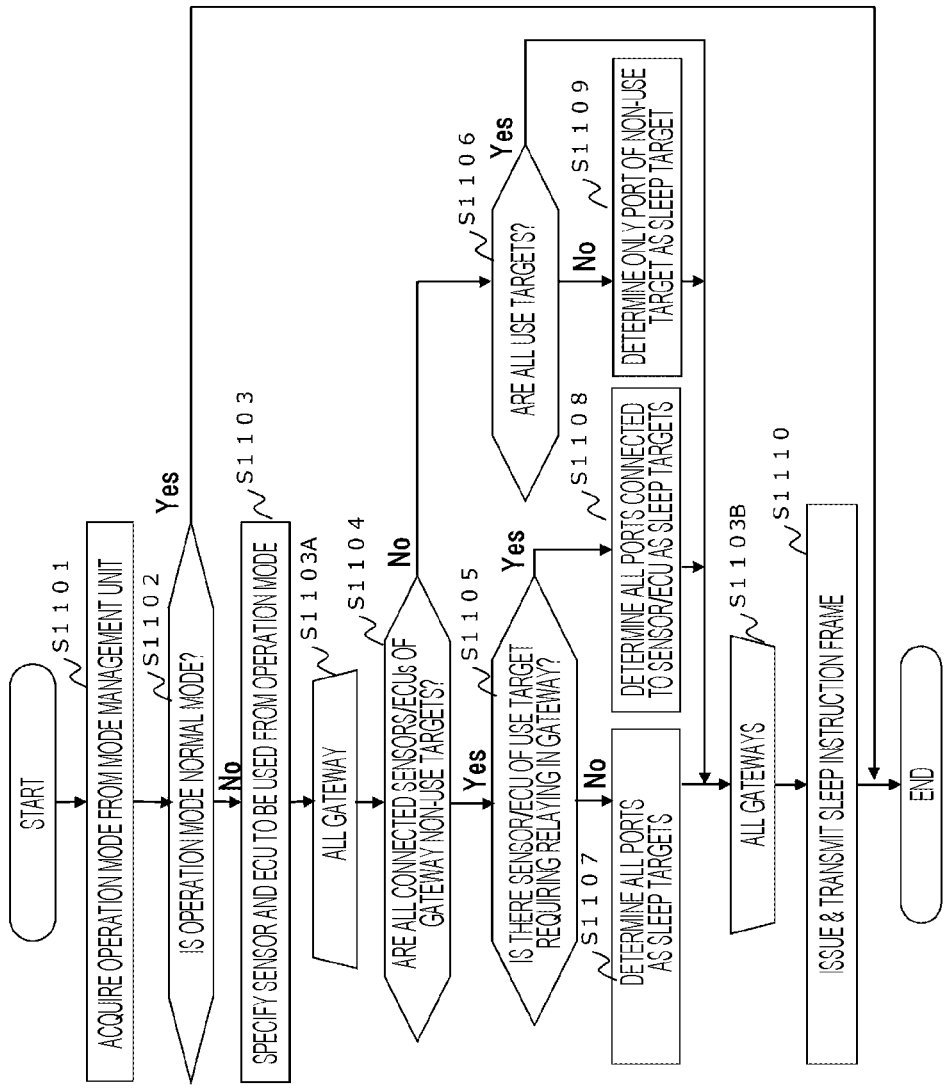
FIG. 7 is a flowchart illustrating the processing of a sleep instruction control unit 5013.

FIG. 7 is a flowchart illustrating a process of the sleep instruction control unit 5013 included in the ECU device 50. In this embodiment, the operation mode is set for every certain time period. When the operation mode is set, the sleep instruction control unit 5013 executes the process illustrated in FIG. 7, and when a certain period of time elapses, that is, when the operation mode is next set, the process illustrated in FIG. 7 is executed again.

First, the sleep instruction control unit 5013 acquires the number of the operation mode to be set in the next cycle from the mode management unit 5011 (S1101). Next, the sleep instruction control unit 5013 determines whether the acquired operation mode is the normal mode, that is, mode 0 (S1102). When determining that the acquired operation mode is not the normal mode, the sleep instruction control unit 5013 proceeds to S1103, and performs a series of processes for determining a sleep instruction as described later. When determining that the acquired operation mode is the normal mode, the sleep instruction control unit 5013 ends the processing illustrated in FIG. 7 because there is no device to sleep.

When determining that the acquired operation mode is not the normal mode, the sleep instruction control unit 5013 specifies the sensor device 10 and the ECU device 50 to be used in the operation mode from the operation mode number and the operation mode management table (S1103). For example, the sleep instruction control unit 5013 may identify the sensor device 10 and the ECU device 50 in which O is described in the corresponding operation mode in the operation mode management table illustrated in FIG. 5.

Next, the sleep instruction control unit 5013 executes the processing from S1103A to S1103B with each gateway device 30 as the processing target. For example, the sleep instruction control unit 5013 executes the processing from S1103A to S1103B with the gateway 1F as the processing target for the first time, then executes the processing from S1103A to S1103B with the gateway 1R as the processing target, and similarly the gateway 2F and the gateway 2R are the processing targets. When the processing as a processing target is completed for all the gateway devices, the process proceeds to S1110.

In S1104, the sleep instruction control unit 5013 determines whether the sensor device 10 and the ECU device 50 connected to the gateway device 30 that is the processing target are all the non-use targets (S1104). For this determination, first, the sensor device 10 and the ECU device 50 connected to the gateway device 30 to be processed are specified using the communication route management table. Next, it is determined whether the sensor device 10 and the ECU device 50 connected to the gateway device 30 to be processed are the use targets. If the sleep instruction control unit 5013 determines that all of the connected sensor devices 10 and ECU devices 50 are the non-use targets, the process proceeds to Step S1105. If the sleep instruction control unit 5013 determines that there is at least one sensor device 10 or ECU device 50 as the use target, the process proceeds to Step S1106.

For example, the ECU device 50 and the sensor device 10 directly connected to the gateway 1F are the ECU 1, the sensor 1A, and the sensor 1B according to the communication route management table illustrated in FIG. 6, and whether these are the use targets may be determined. For example, when the operation mode is mode 2, it is determined that the ECU 1, the sensor 1A, and the sensor 1B are all the non-use targets.

In S1105, the sleep instruction control unit 5013 determines whether there is the sensor device 10 or the ECU device 50 of the use target that requires relaying of its information in the processing target gateway device 30. The determination in this step is performed as follows. The sleep instruction control unit 5013 first specifies the sensor device 10 or the ECU device 50 that needs to have its information be relayed in the processing target gateway device 30, and determines whether the identified sensor device 10 or the ECU device 50 is the use target. Thus, it is possible to determine whether there is the sensor device 10 or the ECU device 50 of the use target that requires relaying of information. For example, when the gateway 1F needs to relay the communication of the sensor 2X, and the operation mode is mode 2, the sensor 2X is the non-use target, so it is determined that there is no sensor device 10 or ECU device 50 that needs to relay information from. The sleep instruction control unit 5013 proceeds to S1107 when it determines that there is no sensor device 10 or ECU device 50 of the use target that requires relaying in the gateway device 30 of the processing target, and proceeds to S1108 when it determines that there is any one.

The sleep instruction control unit 5013 determines all the communication IFs 303 of the gateway device 30 of the processing target as the sleep targets when all the sensor devices 10 or the ECU devices 50 connected to the gateway device 30 of the processing target are the non-use targets, and there is no sensor device 10 or ECU device 50 of the use target that requires relaying of information (S1107). The sleep instruction control unit 5013 determines the communication IF connected to the sensor device 10 or the ECU device 50 as the sleep target when all of the sensor devices 10 or the ECU devices 50 connected to the gateway device 30 of the processing target are the non-use targets, and there is the sensor device 10 or the ECU device 50 of the use target that requires relaying of information (S1108).

When a negative determination is made in S1104, the sleep instruction control unit 5013 determines whether all of the sensor devices 10 and the ECU devices 50 connected to the gateway device 30 of the processing target are use targets (S1106). When it is determined that there is one or more sensor devices 10 or ECU devices 50 that are non-use targets, that is, there is no use target, the process proceeds to S1109. When a negative determination is made in S1106, the sleep instruction control unit 5013 is connected to the gateway device 30 of the processing target, and determines only the communication IF that is the non-use target of the sensor device 10 or the ECU device 50 as the sleep target. When a positive determination is made in S1106, all of the sensor devices 10 and the ECU devices 50 connected to the gateway device 30 of the processing target are the use targets. Therefore, the sleep instruction control unit 5013 determines that there is no sleep target related to the gateway device 30 of the processing target, and the process proceeds to S1110.

For example, when the operation mode is set to mode 2 in the configuration illustrated in FIG. 1, the processes from S1104 to S1109 are performed for the gateways 1F, 1R, 2F and 2R. Through the processes from S1104 to S1109, it is determined that all the ports of the gateway 1F and the gateway 1R are sleep targets, and the gateway 2F and the gateway 2R are not sleep targets.

When the processes from S1103A to S1103B are executed with all the gateway devices 30 as the processing targets, the gateway devices and ports to be the sleep targets are determined. Then, the sleep instruction control unit 5013 issues a sleep instruction frame to the gateway device 30 that is a sleep target, transmits the sleep instruction frame to the gateway device 30 (S1110), and ends the process illustrated in FIG. 6. The sleep instruction frame includes information that specifies a sleep target location, that is, whether all ports are included, and if not all ports are included, information that identifies a sleep target port, and sleep period, that is, information of sleep start time and end time are included.

The sleep target port may be any information as long as the port of the gateway device 30 can be uniquely designated. For example, the identifier of the sensor device 10 connected to the sleep target port can be used, and the identifier of the sensor device 10 can use a MAC address when IEEE 802.3 is used. Instead of using the MAC address, a physical port number of the gateway device 30 may be directly specified. In that case, in the communication route management table referred to by the sleep instruction control unit 5013, the port number connected is also included.

Further, instead of transmitting the sleep instruction frame to each gateway device 30, a single sleep instruction frame may be transmitted to all the gateway devices 30. In that case, the sleep instruction frame further includes information that specifies the target gateway device 30 in addition to the above-described information.

Through the above processing, the sleep instruction control unit 5013 can specify the gateway device 30 or the port of the gateway device 30 that are to be brought into the low power state in the specified operation mode, and can transmit the sleep instruction to the corresponding gateway device 30. Further, even if all of the sensor devices 10 and the ECU devices 50 connected to the gateway device 30 are the non-use targets, if the gateway device 30 is used for relay processing of another sensor device 10 to be used, the communication of the sensor device 10 of the use target can be maintained.

In the above description, the sleep instruction frame is transmitted to the gateway device 30 via a cable for data communication used for communication with the sensor device 10 and the ECU device 50. However, a communication network for transmitting the sleep instruction frame may be prepared separately from the cable for data communication.

(Flowchart of Sleep Control Unit 3011 of Gateway)

Figure 8:
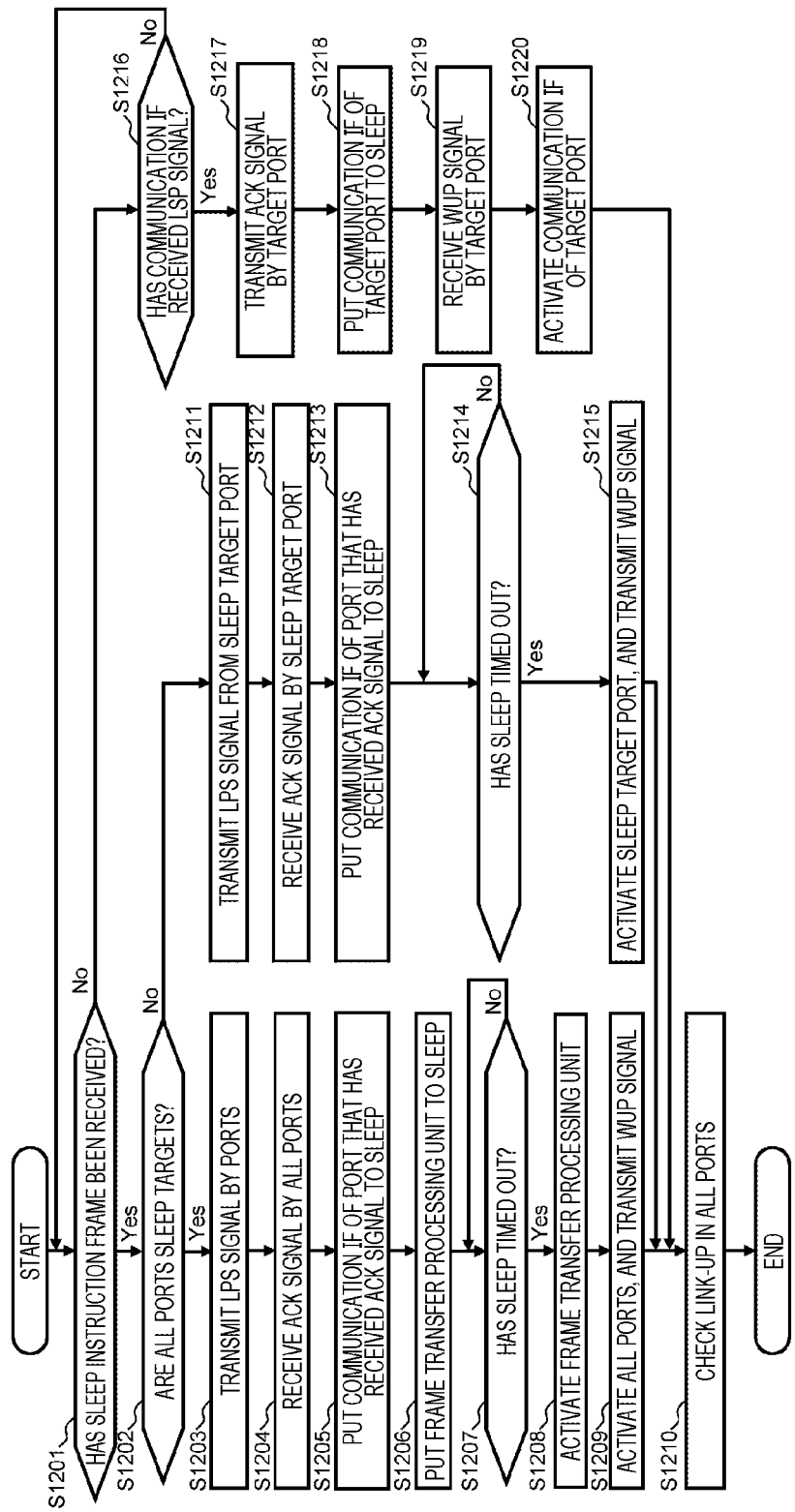
FIG. 8 is a flowchart illustrating the processing of a sleep control unit 3011.

FIG. 8 is a flowchart illustrating a process of the sleep control unit 3011 included in the gateway device 30. There are roughly two processes of the sleep control unit 3011. The first process is a process performed by receiving a sleep instruction frame from the ECU device 50. The second process is a process in which an adjacent port of the gateway device 30 outputs the LPS signal when the port shifts to the sleep state, and the port that has received the LPS signal sleeps. The sleep control unit 3011 executes the process illustrated in FIG. 8 every time the sleep instruction control unit 5013 operates.

The sleep control unit 3011 first confirms whether the sleep instruction frame is received (S1201). When determining that the sleep instruction frame has been received, the sleep control unit 3011 proceeds to S1202, and executes the above-described first process from S1202 to S1215. When determining that the sleep instruction frame has not been received, the sleep control unit 3011 proceeds to S1216.

In S1216, the sleep control unit 3011 determines whether the communication IF 303 has received the LPS signal (S1216). When it is determined that the LPS signal has been received, the above-described second process is executed from S1217 to S1220. When determining that the LPS signal has not been received, the sleep control unit 3011 ends the process illustrated in FIG. 8.

In S1202, the sleep control unit 3011 determines whether all ports are sleep targets (S1202). Specifically, the sleep control unit 3011 determines from the sleep target included in the received sleep instruction frame. The sleep control unit 3011 proceeds to S1203 when determining that all the ports are the sleep targets, and proceeds to S1211 when determining that only some of the ports are the sleep targets.

In S1203, the sleep control unit 3011 causes all ports, that is, all communication IFs 303 to transmit the LPS signals (S1203). Since the device that has received the LPS signal transmits an ACK signal in response, the gateway device 30 receives the ACK signal (S1204). Next, the sleep control unit 3011 shifts the communication IF 303 that has received the ACK signal to the low power state (S1205), and puts the frame transfer processing unit 302 into the low power state (S1206). In Step S1206, the sleep control unit 3011 significantly reduces the processing capacity of the control unit 301 and reduces the power consumption of the control unit 301.

Next, the sleep control unit 3011 determines whether it is a sleep end time (S1207). The sleep control unit 3011 proceeds to S1208 if a positive determination is made, and returns to S1207 if a negative determination is made. That is, whether sleep has timed out is monitored, and when it is determined that sleep has timed out, the process proceeds to S1208. In S1208, the sleep control unit 3011 activates the frame transfer processing unit 302. Also, the sleep control unit 3011 returns the processing capacity of the control unit 301, which has been lowered, to normal.

Next, the sleep control unit 3011 transitions all the communication IFs 303 that have been put to sleep to the normal state, and transmits the WUP signals from those communication IFs 303 (S1209). The sensor device 10 and the ECU device 50, which have received the WUP signal, return the communication IF to the normal state. Finally, the sleep control unit 3011 confirms link-up in all the communication IFs 303 of the gateway device 30, and ends the processing illustrated in FIG. 8 (S1210).

When a negative determination is made in S1202, the sleep control unit 3011 acquires the sleep target of the sleep instruction frame, specifies the communication IF 303 that is the sleep target, and transmits the LPS signal from the communication IF 303 (S1211). In addition, when the communication IF 303 of the sleep target is specified by the identifier of the connected device, the communication IF 303 may be specified by referring to the transfer database (not illustrated). Since the device which has received the LPS signal transmits an ACK signal in response, the gateway device 30 receives the ACK signal (S1212).

Next, the sleep control unit 3011 puts the communication IF 303 that has received the ACK signal into the low power state (S1213). Also, the sleep control unit 3011 reduces the processing capacity of the control unit 301 according to the number of communication IFs 303 in the power saving state, and reduces the power consumption of the control unit 301. Next, the sleep control unit 3011 determines whether it is the sleep end time (S1214), the process proceeds to S1215 when a positive determination is made, and returns to S1214 when a negative determination is made. That is, the sleep control unit 3011 monitors the sleep time-out, and when the time-out occurs, the process proceeds to S1215.

Next, the sleep control unit 3011 puts the communication IF 303 that has been put into sleep into a normal state, transmits the WUP signal (S1215), and proceeds to S1210 described above. The communication interface of the other device that has received this WUP signal is returned to the normal state. Further, in S1215, the sleep control unit 3011 returns the processing capacity of the control unit 301, which has been reduced in S1213, to normal.

When a negative determination is made in S1201, the sleep control unit 3011 determines whether any communication IF 303 has received the LPS signal. If it is determined that any of the communication IFs 303 has received the LPS signal, the process proceeds to S1217, and if it is determined that none of the communication IFs 303 has received the LPS signal, the process illustrated in FIG. 8 ends. In S1217, the sleep control unit 3011 transmits an ACK signal in the communication IF 303 that has received the LPS signal, and puts the communication IF 303 into the low power state (S1218). At this time, the sleep control unit 3011 reduces the processing capacity of the control unit 301 according to the number of communication IFs 303 in the power saving state, and reduces the power consumption of the control unit 301.

After that, when the sleep period of the adjacent gateway device ends, the WUP signal is received from the adjacent gateway device 30 (S1219). Upon receiving the WUP signal, the sleep control unit 3011 activates the corresponding communication IF 303, restores the processing capacity of the control unit 301, which has been reduced in S1218, to normal, and proceeds to S1210 described above (S1220).

According to the process described above, the sleep control unit 3011 of the gateway device 30 causes a designated sleep target to sleep for a designated sleep period according to the sleep instruction frame received from the ECU device 50. Further, when the communication IF 303 of the adjacent gateway device 30 transitions to the low power state, the communication IF 303 connected to the corresponding communication IF 303 can be put into the low power state by receiving the LPS signal, and can be returned to the normal state by receiving the WUP signal when the adjacent gateway device 30 transitions to the normal state.

(Example of Sleep State of Gateway Device 30)

The gateway device 30 can take various sleep states. When communication is no longer necessary for some of the communication IFs 303 of the gateway device 30, the communication IFs 303 may be put into the sleep state in which a frame cannot be received but the WUP signal can be received. Further, when one or more communication IFs 303 are put into the sleep state, the processing capacity of the frame transfer processing unit 302 and the control unit 301 may be reduced to further reduce the power consumption. The reduction in processing capacity can be realized by, for example, reducing the operating frequency or reducing the number of processor cores to be operated.

Further, when communication is no longer necessary for all communication IFs 303, the operation of the frame transfer processing unit 302 may be stopped in addition to setting all the communication IFs 303 in the low power state. Further, the control unit 301 may be in the low power state within a range in which the operation can be started according to the WUP signal.

(Sequence of Sleep Operation)

Figure 9:
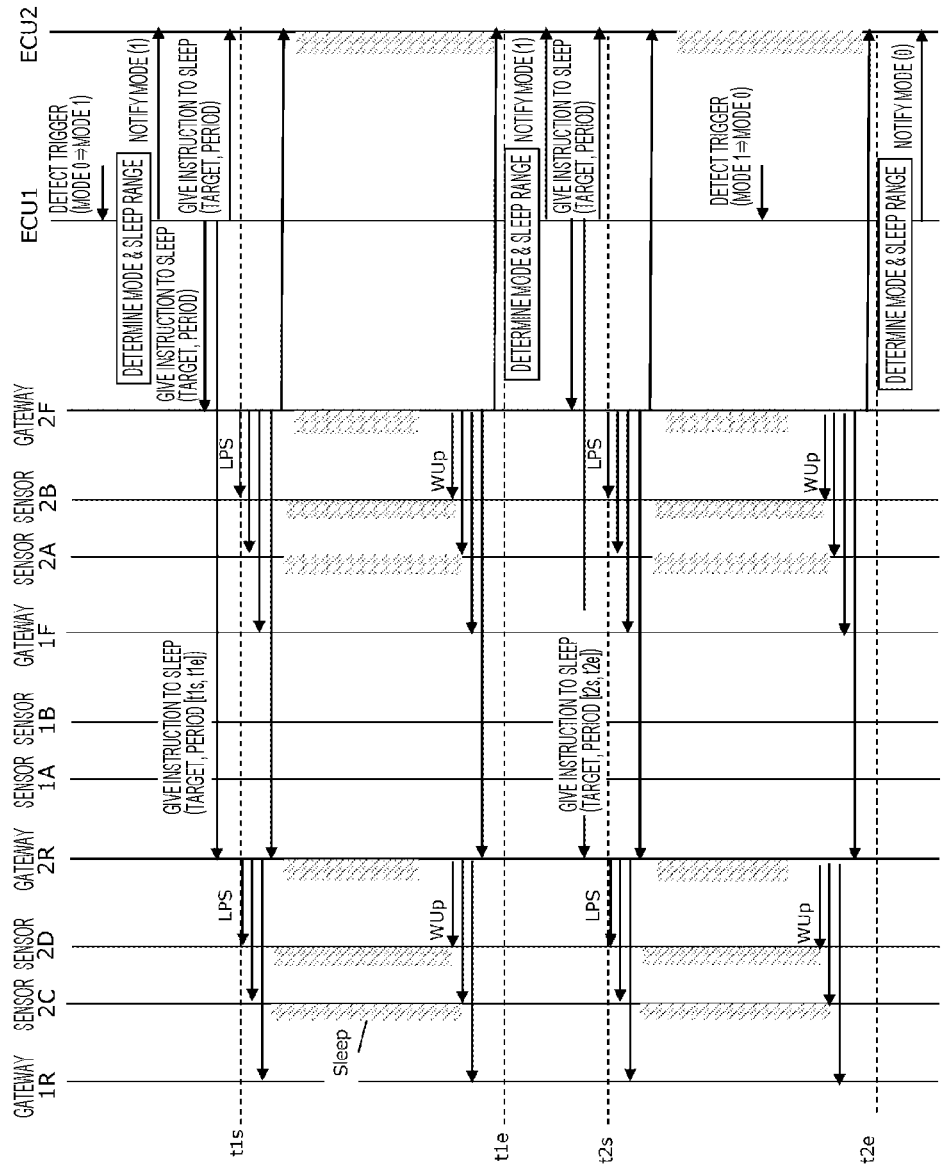
FIG. 9 is a sequence diagram illustrating an example of a sleep operation.

FIG. 9 is a sequence diagram illustrating an example of the sleep operation in the in-vehicle network system S. In this example, in the configuration of the in-vehicle network illustrated in FIG. 1, the operation is started in the state of mode 0, changed to mode 1, and then returned to mode 0. In FIG. 9, time elapses from top to bottom in the drawing. In the initial state illustrated in the upper part of FIG. 9, the operation mode is mode 0 and all the devices are in the normal state.

First, the ECU 1 detects a trigger for changing to mode 1. The trigger is, for example, detection of a failure of the ECU 2 by the ECU 1 when a failure occurs in the ECU 2. Next, in the ECU 1, the mode management unit 5011 determines the mode to be set in the next cycle as mode 1 based on this trigger. Then, the sleep instruction control unit 5013 determines the gateway device 30 to be a sleep target and the communication IF 303 to be a sleep target in mode 1. In this example, all ports of the gateway 2F and all ports of the gateway 2R are set as sleep targets.

Next, when the ECU 1 determines the operation mode and the sleep range, the ECU 1 notifies the ECU 2 of the determined mode and shares the mode to be operated by the ECU 1 and the ECU 2. Next, the ECU 1 transmits a sleep instruction frame to the gateway 2F and the gateway 2R which are the sleep target gateways. The sleep period specified in this sleep instruction frame is from time t1s to time t1e.

Next, the gateway 2F or the gateway 2R performs sleep control operation based on the received sleep instruction frame. At the sleep start time t1s, the gateway 2F and the gateway 2R transmit the LPS signals from all the communication IFs 303 that are the sleep targets. The gateway 2F transmits the signal to the sensor 2A, the sensor 2B, the gateway 1F, the gateway 2R, and the ECU 2. The gateway 2R transmits the signal to the sensor 2C, the sensor 2D, the gateway 1R, and the gateway 2F. Each device that has received the LPS signal transmits an ACK signal to the transmission source. Here, since the LPS signal from the gateway 2F to the gateway 2R has been transmitted first, the gateway 2R transmits the ACK signal to the gateway 2F.

Next, the sensor device 10 and the ECU device 50 that have received the LPS signal put the communication interface into the low power state. Further, the sensor device 10 and the ECU device 50 may be put into the low power state even in the parts other than the communication interface. For example, a clock frequency of the processing of the processor provided in the sensor device 10 or the ECU device 50 may be lowered, or the parts other than those required to start the device when the WUP signal is received by the communication interface may be turned off.

The gateway 1F that has received the LPS signal puts only the communication IF 303 connected to the gateway 2F into the low power state, and the other communication IF 303 maintains the normal state. The gateway 1R that has received the LPS signal puts only the communication IF 303 connected to the gateway 2R into the low power state, and the other communication IF 303 maintains the normal state.

Further, the gateway 2F and the gateway 2R make all the ports of the communication IFs 303 sleep, so that the frame transfer processing unit 302 also makes a transition to the sleep state.

When the gateway 2F and the gateway 2R detect that the time is a predetermined time before the time t1e, which is the sleep end time, the WUP signal is transmitted to all the ports. The sensor device 10 and the ECU device 50 that have received the WUP signal return to the normal state. Further, the gateway 2F and the gateway 2R also return the frame transfer processing unit 302 and the communication IF 303 to the normal state. Here, the predetermined time is a time required to return from the sleep state to the normal state. The reason why the WUP signal is transmitted before the predetermined time is to return to the normal state at the sleep end time. As described above, a series of processes in the first cycle, in which the mode is determined, the sleep is performed, and the sleep is finished to return to the original state, is completed.

Also, in the second cycle, similarly to the process in the first cycle, the mode is determined, the device and port to be the sleep target are determined, the target location is put to sleep, and the normal state is restored. Mode 1 is also set in the second cycle. It is assumed that the ECU 1 detects a trigger for changing to mode 0 in the middle of the second cycle. For example, the trigger is set to mode 1 due to the failure of the ECU 2, but the detection of the recovery of the failure of the ECU 2 can be exemplified. In the first embodiment, the sleep for the gateway device and the sensor is executed until the end period, and the operation mode is determined as mode 0 at the start of a third cycle which is the next cycle.

According to the above sequence operation, it is possible to periodically set the operation mode suitable for the situation and set the sensor and the gateway device to the sleep state based on the operation mode.

In the operation example of the above sequence, the case where the operation mode is set to mode 1 and the gateway 2F and the gateway 2R are in the sleep state has been described. The same operation is possible even when the operation mode is set to another mode such as mode 2 or mode 3. For example, when the operation mode is set to mode 2, the gateway 1R and the gateway 1F enter the sleep state. Further, for example, when the operation mode is set to mode 3, the gateway 2R enters the sleep state.

In the above description, the communication management unit and the sleep instruction control unit 5013 are mounted on the ECU 1, but the invention is not necessarily limited to this. For example, a device other than the ECU 1 may be able to communicate with the ECU 1. Further, one of the gateway devices, for example, the communication management unit or the sleep instruction control unit 5013 may be mounted on the gateway 30-1F.

According to the first embodiment, the following operational effects are obtained.

(1) The in-vehicle network system S is mounted on the vehicle 100 which includes the ECU device 50, the plurality of gateway devices 30, and the plurality of sensor devices 10 for collecting ambient information that is the surrounding information of the vehicle 100. Each of the sensor devices 10 communicates with the ECU device 50 via at least one gateway device 30. The ECU device 50 includes the mode management unit 5011 that determines one of the plurality of operation modes associated with the sensor device 10 to be operated, and the sleep instruction control unit 5013 that specifies the gateway device 30 in which in which the connected sensor device 10 does not operate based on the operation mode determined by the mode management unit 5011 and the gateway device 30 transitions to the low power state. The gateway device 30 is connected to the plurality of sensor devices 10 that do not operate in any one of the same operation modes without interposing another gateway device 30.

Therefore, in an operation mode in which one of the sensor devices 10 does not operate, it is possible to reduce the processing capacity of the gateway device 30 connected to the sensor device 10 and transition to a low power consumption state. Generally, the connection between the sensor device 10 and the gateway device 30 is designed to shorten the wiring length. Therefore, in the example of FIG. 1, the sensor 1C and the sensor 2C are conventionally connected to the gateway 1R, and the sensor 1D and the sensor 2D are connected to the gateway 2R. In this case, the gateway 1R or the gateway 2R can stop the frame transfer processing unit 302 only when both the first group and the second group do not operate.

However, in this embodiment, the gateway device 30 is connected to the plurality of sensor devices 10 that do not operate in any one of the same operation modes without interposing another gateway device 30. For example, the gateway 1R is directly connected to the sensor 1C and the sensor 1D that do not operate in the same mode 2. Therefore, in mode 2, the gateway 1R does not need to transfer the ambient information output by the sensor device 10, and power consumption can be reduced.

(2) In the low power state, the gateway device 30 reduces the processing capacity according to the number of devices that are connected and do not require communication. Even if the number of connected devices is large, if the number of devices that communicate in a certain operation mode decreases, the processing will not be saturated even if the processing capacity is reduced according to the rate of the phenomenon, so power consumption can be further reduced.

(3) The sleep instruction control unit 5013 stops the communication function of the gateway device 30 when it is determined that the gateway device 30 in which the directly connected sensor device 10 does not operate does not need to relay communication with another gateway device 30 based on the operation mode determined by the mode management unit 5011. The gateway device 30 has a certain power saving effect even when each communication IF 303 is in the low power state. However, further power saving effect is obtained by stopping the communication function itself.

(4) The in-vehicle network system S includes a plurality of ECU devices 50. A first group including the first ECU device 50 and the first sensor device 10 and a second group including the second ECU device 50 and the second sensor device 10 are configured. The first sensor device 10 is connected to the first ECU device 50 via the first gateway device 30. The second sensor device 10 is connected to the second ECU device 50 via the second gateway device 30. When detecting a malfunction of the first ECU device 50, the mode management unit 5011 determines the operation mode as mode 2 in which the degeneration operation using the second group is performed, and when the malfunction of the second ECU device 50 is detected, determines the operation mode as mode 1 in which the degenerate operation using the first group is performed. The sleep instruction control unit 5013 transitions the first gateway device 30 to the low power state in mode 2, and transitions the second gateway device 30 to the low power state in mode 1.

(5) The ECU device 50 is mounted on the vehicle 100 in communication with the plurality of gateway devices 30 and the plurality of sensor devices 10 that collect ambient information that is information around the vehicle 100. There are provided the mode management unit 5011 that determines one of the plurality of operation modes associated with the sensor device 10 to be operated, and the sleep instruction control unit 5013 that specifies the gateway device 30 in which the connected sensor device 10 does not operate based on the operation mode determined by the mode management unit 5011 and the gateway device 30 transitions to the low power state. Therefore, the ECU device 50 can transition the appropriate gateway device 30 to the low power state.

(6) The gateway device 30 relays communication between the ECU device 50 that determines one of the plurality of operation modes associated with the sensor device 10 to be operated, and the plurality of sensor devices 10 that collect ambient information that is the surrounding information of the vehicle 100. The plurality of sensor devices 10 that do not operate in any one of the same operation modes are connected without interposing another gateway device 30. Therefore, since the plurality of sensor devices 10 connected in a certain operation mode do not operate, the gateway device 30 can transition the communication IF 303 connected to these sensor devices 10 to the low power state, and can further reduce the power consumption of the gateway device 30 by reducing the processing capacity of the control unit 301 according to the number of communication IFs 303 in the low power state.

(First Modification)

In the above-described first embodiment, the sleep instruction control unit 5013 of the ECU device 50 transmits the sleep instruction frame to the gateway device 30. Then, the gateway device 30 that has received the sleep instruction frame transmits the LPS signal to the sensor device 10 and the ECU device 50, and causes its own device to transition to the sleep state. However, the ECU device 50 may output the sleep instruction frame to the sensor device 10 or the ECU device 50, and then shift the gateway device 30 to the sleep state.

Figure 10:
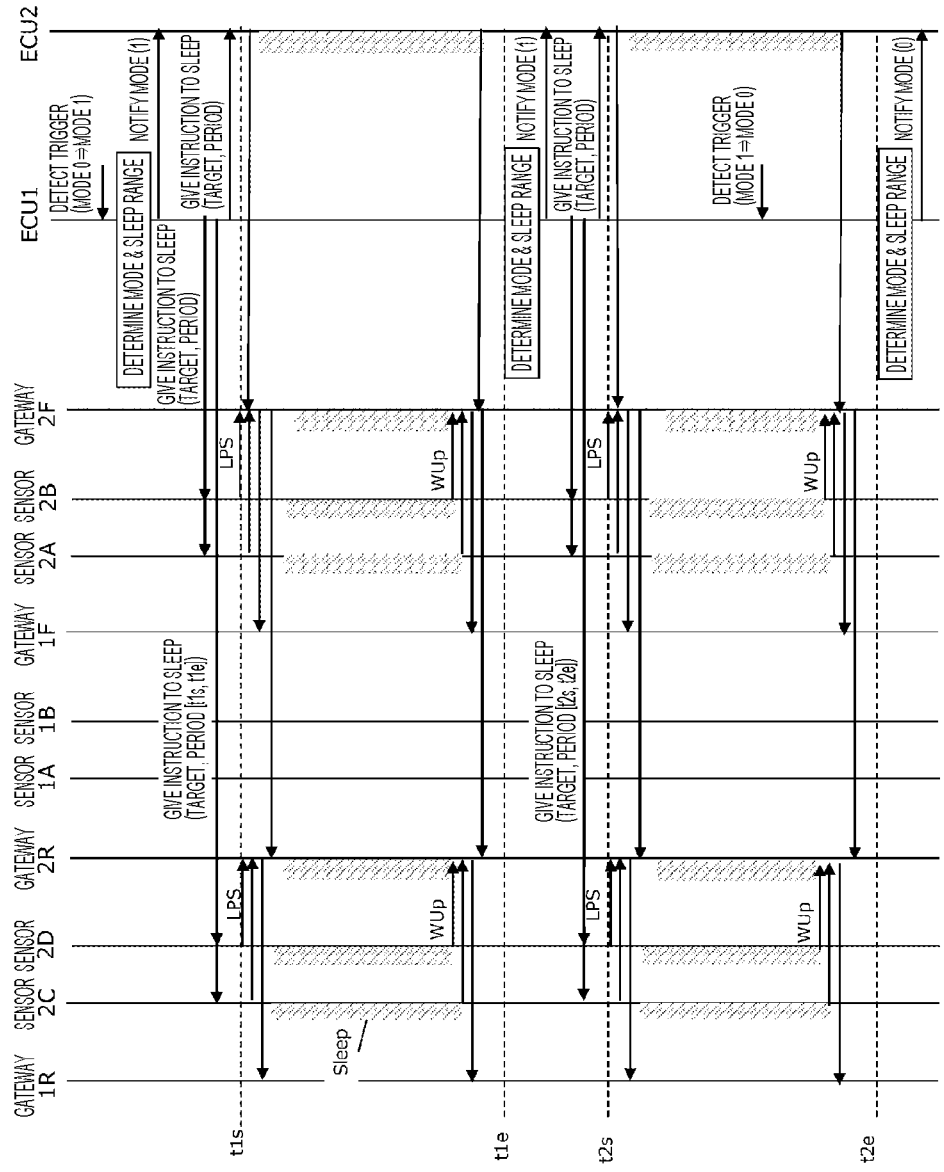
FIG. 10 is a sequence diagram illustrating an example of a sleep operation in a first modification.

FIG. 10 is a sequence diagram illustrating an example of the sleep operation in a first modification. FIG. 10 corresponds to FIG. 9 in the first embodiment. In the sequence diagram illustrated in FIG. 10, the sleep instruction control unit 5013 transmits the sleep instruction frame to the sensor device 10 or the ECU device 50, and the sensor device 10 or the ECU device 50 that has received the sleep instruction frame transmits the LPS signal to the gateway device 30. When the gateway device 30 receives the LPS signal from the connected sensor device 10 or ECU device 50, the gateway device 30 determines whether communication with another gateway device is necessary, and transitions to the sleep state when determining that the communication is unnecessary. Further, at the designated time, the sensor device 10 or the ECU device 50 is activated, and the WUP signal is transmitted to the gateway device 30. The gateway device 30 that has received the WUP signal activates another communication IF 303 in the low power state to transmit the WUP signal, and further returns all the communication IF 303 to the normal state.

(Operation of Sensor Device 10)

The operation of the sensor device 10 in this modification will be described. In this modification, the sensor device 10 sets the normal state and the sleep state based on the sleep instruction frame transmitted by the ECU device 50.

When the communication IF 105 of the sensor device 10 receives the sleep instruction frame from the ECU device 50, the sleep instruction frame is output to the arithmetic processing unit 102. The arithmetic processing unit 102 outputs the sleep instruction frame to the sleep control unit 1011 based on the destination of the sleep instruction frame. The sleep control unit 1011 analyzes the sleep instruction frame and acquires a sleep target and a sleep period. In this modification, the control unit 101 manages the synchronized time in the entire in-vehicle network system S. The sleep control unit 1011 outputs the LPS signal to the gateway device 30 when the designated sleep start time comes, and transitions the communication IF 105 of the sensor device 10, the arithmetic processing unit 102, and the measurement unit 103 to the sleep state when receiving the ACK signal from the gateway device 30.

When the designated sleep end time is reached, the sensor device 10 outputs the WUP signal to the gateway device 30 and changes the measurement unit 103 and the arithmetic processing unit 102 to the normal state. Also, in this modification, the gateway device 30, the sensor device 10, and the ECU device 50 can be brought into the low power state based on the set operation mode.

Second Embodiment

A second embodiment of the in-vehicle network system S according to the invention will be described with reference to FIGS. 11 and 12. In the first embodiment, the transmission cycle of the ambient information transmitted by the sensor device 10 is constant regardless of the operation mode. However, since more sensor devices 10 and ECU devices 50 operate in the normal mode than in the other operation modes, the amount of communication increases and the processing load of the ECU device 50 increases compared to the other operation modes. Further, in the low power state, the number of operating sensor devices 10 decreases, so the amount of collectable information decreases, and the performance of recognizing the surrounding environment of the vehicle 100 may deteriorate. Furthermore, in the low power state, the number of operating sensor devices 10 is reduced, and thus there is a possibility that the detection of a trigger for changing the operation mode may be delayed.

Therefore, in the second embodiment, the transmission cycle of the sensor device 10 used for each operation mode is controlled. In the first embodiment, the combination of the sensor used and the ECU is the operation mode, but in the second embodiment, the combination of the sensor used, the ECU, and the transmission cycle of the sensor used is called the operation mode. In the following description, the same components as those in the first embodiment are denoted by the same reference numerals, and differences will be mainly described. The points that are not particularly described are the same as in the first embodiment.

According to the second embodiment, it is possible to select a wider variety of operation modes, and thus it is possible to set an operation mode more suitable for the situation. Further, by setting the transmission cycle in the normal mode to be relatively longer than that in the other operation modes, it is possible to reduce the power consumption in the normal mode and improve the recognition performance in the low power state.

In the following, the second embodiment will be described with a focus on the differences from the first embodiment. The main differences between the two are the operation mode management table and the sleep instruction control operation.

(Operation of Sensor Device 10)

The sensor device 10 according to the second embodiment performs the following operations in addition to the operations in the first embodiment. That is, the sensor device 10 receives, from the sleep instruction control unit 5013 of the ECU device 50, a transmission cycle instruction frame including cycle information for changing the transmission cycle and transmission cycle to be set. Then, the sensor device 10 acquires the transmission cycle from the transmission cycle instruction frame and transmits the ambient information at the designated transmission cycle. Further, here, the transmission cycle of the frame including the ambient information is the same as the cycle of measuring the value of the sensor, but the cycles of both may be different.

The transmission cycle instruction frame received by the sensor device 10 is input to the management unit 1012 of the control unit 101. The management unit 1012 analyzes the input transmission cycle instruction frame, and acquires the transmission cycle to be set and the period for changing the transmission cycle. Then, the management unit 1012 issues an instruction to change the sampling period to the measurement unit 103 when the designated period comes.

(Operation Mode Management Table)

FIG. 11 is a diagram illustrating an example of the operation mode management table in the second embodiment. The difference from the first embodiment is that in the first embodiment, only information about whether to use in each mode is stored, whereas in the second embodiment, the data transmission cycle of the sensor is stored in when using each mode. FIG. 11 illustrates that, for example, when the sensor 1A is in mode 0, the transmission cycle is T0_1a, and when in mode 1, the transmission cycle is T1_1a. In the first embodiment, the cycle in which the sensor device 10 transmits the ambient information is constant regardless of the operation mode, but in the second embodiment, the cycle to transmit the ambient information can be changed depending on the operation mode.

In the above example, the value of the transmission cycle itself is stored, but instead, the value of the ratio may be stored based on the transmission cycle in mode 0. Further, the value of each transmission cycle needs to be determined in consideration of a maximum communication rate in each section of the in-vehicle network in each mode.

Further, in the example of FIG. 11, the combination of the sensor to be used and the ECU is different depending on the operation mode, but the combination of the sensor and the ECU is the same. A mode in which only the transmission cycle of the sensor is different may be prepared. For example, mode 4A may be prepared which has the same sensor and ECU as mode 4 but has a different transmission cycle. In the above example, the value of the transmission cycle is prepared for each sensor and mode, but a uniform value may be prepared for each mode. For example, in mode 1, the transmission cycle in mode 0 may be 0.5 times. By setting in this way, the data size of the operation mode management table can be reduced.

Further, regarding the data transmission cycle in each operation mode, the following advantages can be obtained if the transmission cycle in the normal mode is relatively long and the transmission cycle in the low power state is relatively short. That is, the processing load on the sensor, the gateway device, and the ECU in the normal mode can be reduced, and the power consumption in the normal mode can be reduced. Further, since the transmission cycle in the low power state becomes short, recognition can be made more quickly using the sensor. Further, in the low power state, it becomes possible to detect a trigger for returning to the normal mode earlier.

(Flowchart of Sleep Instruction Control Unit 5013)

Figure 12:
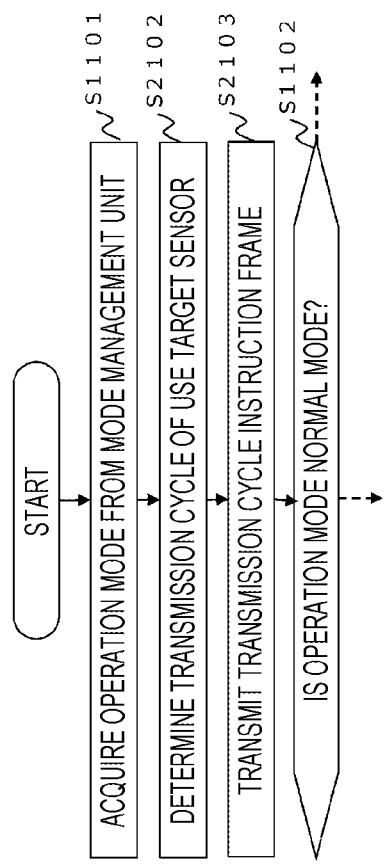
FIG. 12 is a flowchart illustrating the operation of the sleep instruction control unit 5013 in the second embodiment.

FIG. 12 is a flowchart illustrating the operation of the sleep instruction control unit 5013 in the second embodiment. The difference from the first embodiment is that after acquiring the operation mode in S1101, a process of determining the transmission cycle of the use target sensor (S2102), and a process of issuing a transmission cycle instruction frame to the use target sensor and transmitting the transmission cycle instruction frame (S2103) are added. However, in FIG. 12, the processes after S1104 are the same as those in the first embodiment, so that the illustration thereof is omitted.

In S2102, the transmission cycle of the use target sensor is determined by referring to the operation mode management table based on the operation mode acquired in the process of S1101. In S2103, a transmission cycle instruction frame storing the transmission cycle acquired in S2102 is issued to the use target sensor, and is transmitted to the use target sensor.

According to the second embodiment, the following operational effects are obtained.

(7) The sleep instruction control unit 5013 of the ECU device 50 determines the cycle in which the sensor device 10 transmits the ambient information based on the operation mode determined by the mode management unit 5011, and causes the sensor device 10 to transmit the ambient information in the determined cycle. Therefore, it is possible to further increase the operation modes of the vehicle 100, cope with a wider variety of situations, and achieve low power consumption.

Third Embodiment

A third embodiment of the in-vehicle network system S will be described with reference to FIGS. 13 and 14. In the following description, the same components as those in the first embodiment are denoted by the same reference numerals, and differences will be mainly described. The points that are not particularly described are the same as in the first embodiment. In the first embodiment, the ambient information transmitted by the sensor device 10 to be used has been transmitted without duplication regardless of the operation mode. However, in the low power state, a smaller number of the sensor devices 10 and the ECU devices 50 operate than in the normal mode, so that the frame loss that occurs during the transmission of the ambient information may lead to a reduction in recognition performance and a delay in detection of peripheral objects.

In the third embodiment, the number of times of duplicate transmission in the sensor device 10 is controlled in addition to controlling the gateway device 30 and the sensor device 10 that sleep for each operation mode. That is, in the second embodiment, the transmission cycle of the use target sensor has been controlled based on the operation mode, whereas in the third embodiment, the number of times of duplicate transmission of the use target sensor is controlled based on the operation mode. In the following, the third embodiment will be described with a focus on the differences from the second embodiment. The main differences are the function of the sensor device 10, the configuration of the operation mode management table, and the operation of the sleep instruction control unit 5013.

(Operation Mode Management Table)

FIG. 13 is a diagram illustrating an example of the operation mode management table in the third embodiment. The operation mode management table in the third embodiment is similar to the operation mode management table in the second embodiment. The value of the transmission cycle is stored in the second embodiment, whereas in the third embodiment, the value of the number of times of duplicate transmission is stored. For example, in the example illustrated in FIG. 13, in mode 0, the number of times of duplicate transmission is 0 for which duplicate transmission is not performed for all sensor devices 10. In mode 1 and mode 2, the number of times of duplicate transmission of all the sensor devices 10 to be used is 1. In mode 3, the number of times of duplicate transmission of the sensors 1C and 1D is 2, and the number of times of duplicate transmission of the other sensor devices 10 is 1.

(Operation of Sensor Device 10)

The sensor device 10 according to the third embodiment performs the following operation in addition to the operation in the first embodiment. That is, the sensor device 10 receives a number-of-times-of-duplicate-transmission instruction frame from the sleep instruction control unit 5013 and acquires the number of times of duplicate transmission. Then, the sensor device 10 copies and transmits the frame including the ambient information by the specified number of times of duplicate transmission. For example, when the number of times of duplicate transmission is 1, one identical frame is added and a total of two are generated and transmitted to the gateway device. When the sensor device 10 receives the number-of-times-of-duplicate-transmission instruction frame, the frame is input to the management unit 1012 of the control unit.

The management unit 1012 analyzes the input number-of-times-of-duplicate-transmission instruction frame, and acquires the number of times of duplicate transmission to be set and the period for changing the number of times of duplicate transmission. Then, when the designated period comes, the management unit 1012 instructs the arithmetic processing unit 102 to change the number of times of duplicate transmission. The arithmetic processing unit 102 generates a frame including ambient information based on the signal received from the measurement unit 103. Then, the arithmetic processing unit 102 copies the frame based on the designated number of times of duplicate transmission and outputs the frame to the communication IF 105.

(Flowchart of Sleep Instruction Control Unit 5013)

Figure 14:
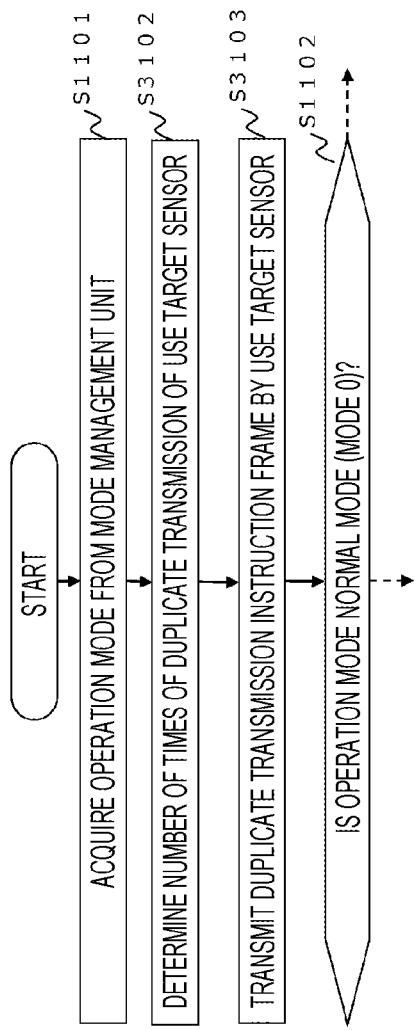
FIG. 14 is a flowchart illustrating the operation of the sleep instruction control unit 5013 in the third embodiment.

FIG. 14 is a flowchart illustrating the operation of the sleep instruction control unit 5013 in the third embodiment. The difference from the first embodiment is that after executing S1101, S3102 and S3103 are performed, and the process proceeds to S1102. However, in FIG. 14, the processes after S1102 are the same as those of the first embodiment, so that the illustration thereof is omitted.

In S3102, the sleep instruction control unit 5013 determines the number of times of duplicate transmission of the use target sensor by referring to the operation mode management table based on the operation mode acquired in the process of S1101. In S3103, the sleep instruction control unit 5013 issues a number-of-times-of-duplicate-transmission instruction frame in which the number of times of duplicate transmission acquired in S3102 is stored, to the use target sensor, and transmits the frame to the use target sensor.

According to the third embodiment, the following operational effects are obtained.

(8) The sleep instruction control unit 5013 of the ECU device 50 determines the number of times the sensor device 10 redundantly transmits the ambient information based on the operation mode determined by the mode management unit 5011, and causes the sensor device 10 to transmit the ambient information in duplicate by the determined number of times. Therefore, in the low power state where the sensor device 10 to be used is small, it is possible to reduce a substantial frame loss rate in an in-vehicle network, and to prevent a reduction in recognition performance and a delay in detection of a trigger for returning to a normal mode.

Fourth Embodiment

A fourth embodiment of the in-vehicle network system S will be described with reference to FIGS. 15 to 17. In the following description, the same components as those in the first embodiment are denoted by the same reference numerals, and differences will be mainly described. The points that are not particularly described are the same as in the first embodiment.

In the first embodiment, during the sleep period designated at the time of the sleep instruction, even if a trigger for returning to mode 0 that is the normal mode is detected, there is a need to wait until the designated sleep period ends to return to the normal state. However, when the sensor device 10 used in the low power state fails, the recognition performance of the surrounding environment may deteriorate, so it is desirable that the mode can be changed early.

In the fourth embodiment, when the trigger for returning to mode 0 is detected, the gateway device 30, the sensor device 10, and the ECU device 50 in the sleep state are activated without waiting for the sleep end time. However, when the communication IF of the gateway device 30 and the sensor device 10 is in the low power state, the frame transmitted by the ECU device 50 cannot be received and cannot be activated. Therefore, when the ECU device 50 detects the trigger for returning to mode 0, the ECU device 50 transmits a sleep release instruction frame to the gateway device 30 in the normal state. Then, the gateway device 30 activates the communication IF 303 in the low power state, transmits the WUP signal, and activates the adjacent device.

In the following, the third embodiment will be described focusing on the differences from the first embodiment. The main differences are the sleep control sequence, the sleep instruction control operation, and the sleep control operation of the gateway device 30.

(Sleep Control Sequence)

Figure 15:
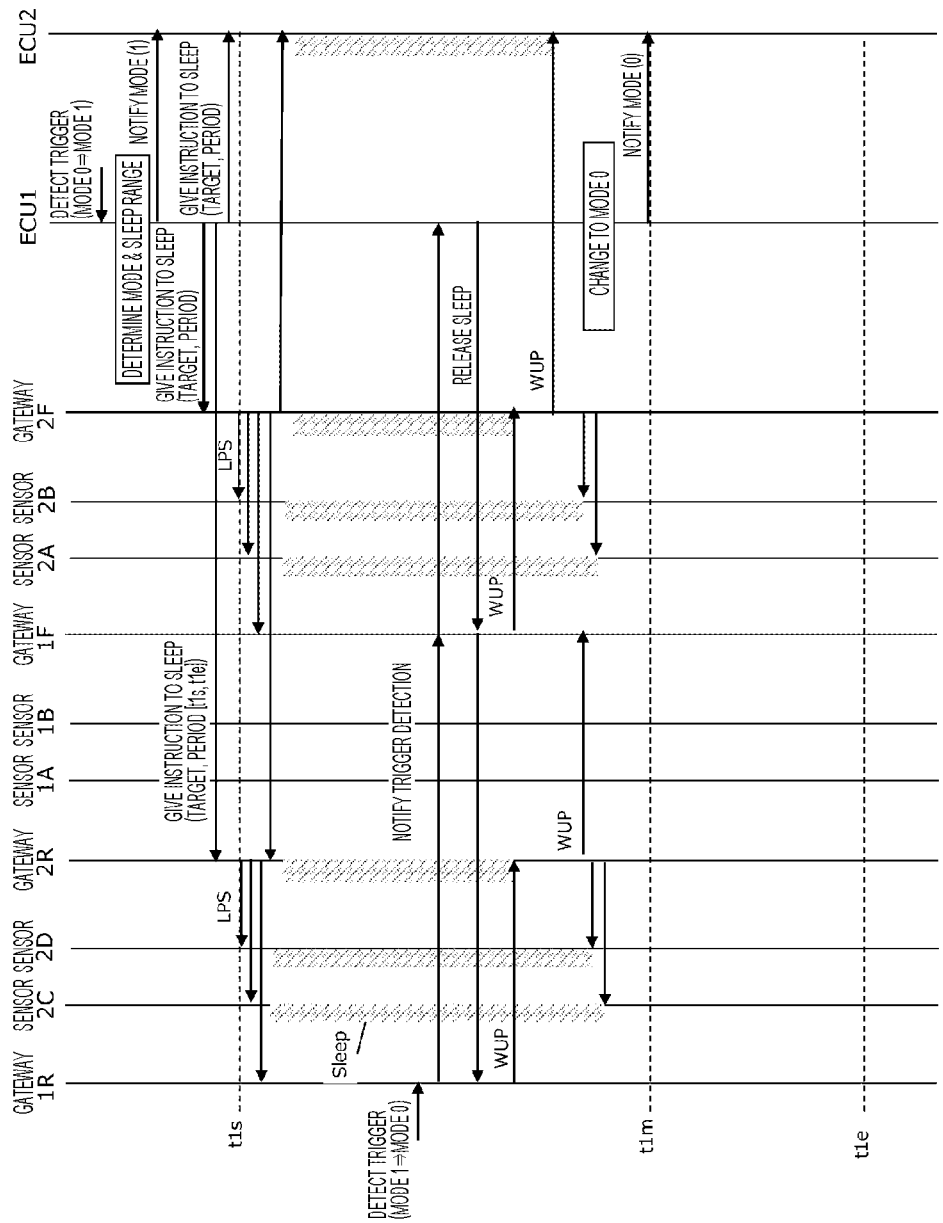
FIG. 15 is a sequence diagram illustrating an example of a sleep operation in a fourth embodiment.

FIG. 15 is a sequence diagram illustrating an example of the sleep control operation in the fourth embodiment. In this example, the gateway 1R detects a trigger for changing the operation mode from mode 0 to mode 1 and returning to mode 0 during the period of mode 1. Since the difference from the first embodiment is the operation after detecting the trigger to mode 0, only this part will be described.

When the gateway 1R detects the trigger of mode 0, the gateway 1R transmits a frame notifying the ECU 1 that the trigger is detected. This frame is transmitted to the ECU 1 via the gateway 1F. Next, when the ECU 1 receives the trigger detection notification, the ECU 1 transmits a frame for instructing the sleep release to all the gateway devices 30, the ECU device 50, and the sensor device 10.

Next, the gateway 1R and the gateway 1F that have received the sleep release instruction frame transmit the WUP signal from all the communication IFs 303 that are in the low power state. In this example, the gateway 1R transmits the WUP signal to the gateway 2R, and the gateway 1F transmits the WUP signal to the gateway 2F.

Next, when the gateway 2R and the gateway 2F in the sleep state receive the WUP signal, the sleep control unit 3011 transitions each constituent unit to the normal state, and the WUP signal is transmitted from the other communication IF 303 in the low power state. The gateway 2R transmits the WUP signal to the gateway 1F, the sensor 2C, and the sensor 2D. The gateway 2F transmits the WUP signal to the ECU 2, the sensor 2A, and the sensor 2B. The device in the sleep state that has received the WUP signal transitions to the normal state.

Next, the ECU 1 changes the operation mode to mode 0 and notifies the ECU 2 of the change to mode 0. As a result, the entire in-vehicle network system returns to the normal state at time t1m. In the first embodiment, mode 0 transitions to the time t1e later than the time t1m, but according to the fourth embodiment, it is possible to quickly recover from the sleep state to the normal state.

(Flowchart of Sleep Instruction Control)

Figure 16:
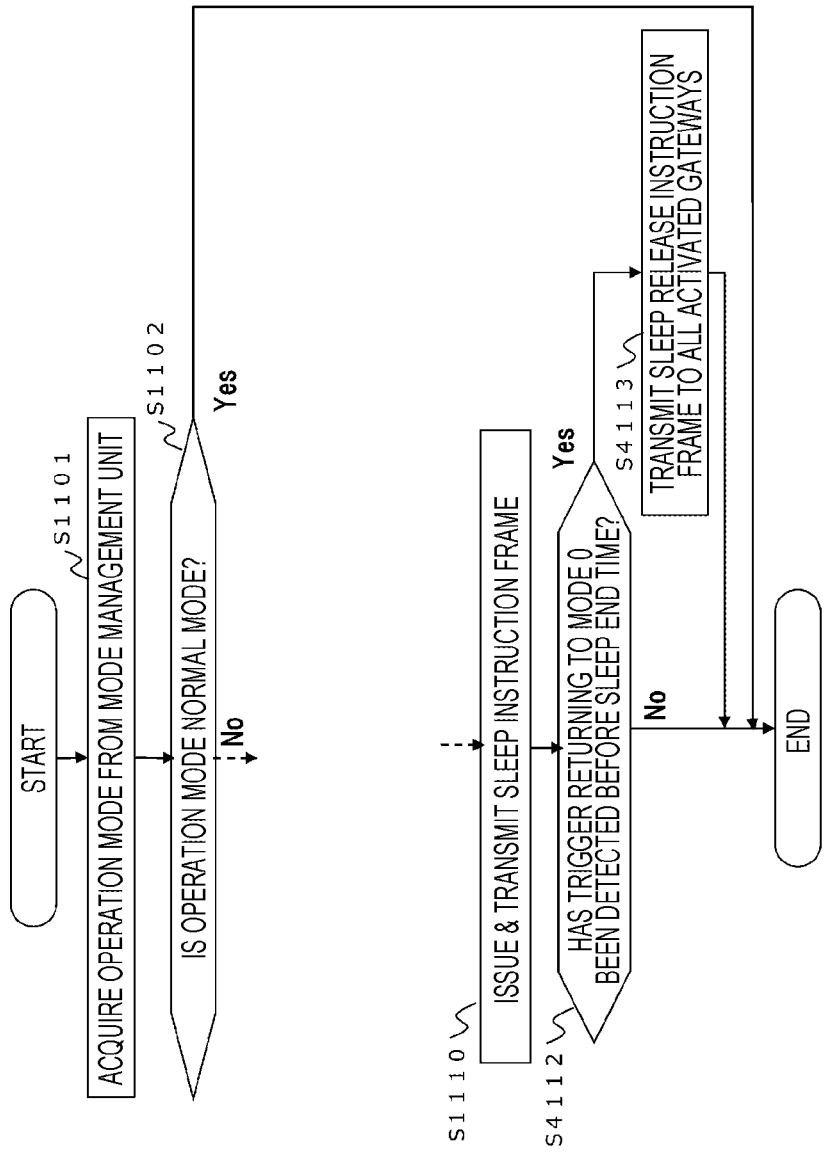
FIG. 16 is a flowchart illustrating the operation of the sleep instruction control unit 5013 in the fourth embodiment.

FIG. 16 is a flowchart illustrating the operation of the sleep instruction control unit 5013 in the fourth embodiment. Since the processes from S1101 to S1110 are the same as those of the first embodiment, a part of the description and the drawing is omitted. In the fourth embodiment, the processes after S1110 are different.

In the first embodiment, the sleep instruction control unit 5013 waits until the sleep end time after transmitting the sleep instruction frame to the gateway device 30. However, in the fourth embodiment, it is monitored whether the trigger for returning to mode 0 is detected at the time before the sleep end time (S4112). Then, the sleep instruction control unit 5013 ends the process when the trigger is not detected until the sleep end time. When the sleep instruction control unit 5013 detects the trigger, the sleep instruction control unit 5013 transmits the sleep release instruction frame to all the gateway devices 30 that have been activated (S4113), and ends the process.

The trigger for returning to mode 0 may be detected directly by the ECU 1, or may be detected by another device and notified to the ECU 1, and the ECU 1 may detect the trigger.

Through the above processes, even before the sleep end time, it is possible to quickly return to the normal state when the trigger is detected. Although the ECU 1 transmits the sleep release instruction frame here, each gateway device 30 may transmit the sleep release instruction frame. In that case, the gateway device 30 has a function of transmitting the sleep release instruction frame.

(Flowchart of Sleep Control Unit 3011)

Figure 17:
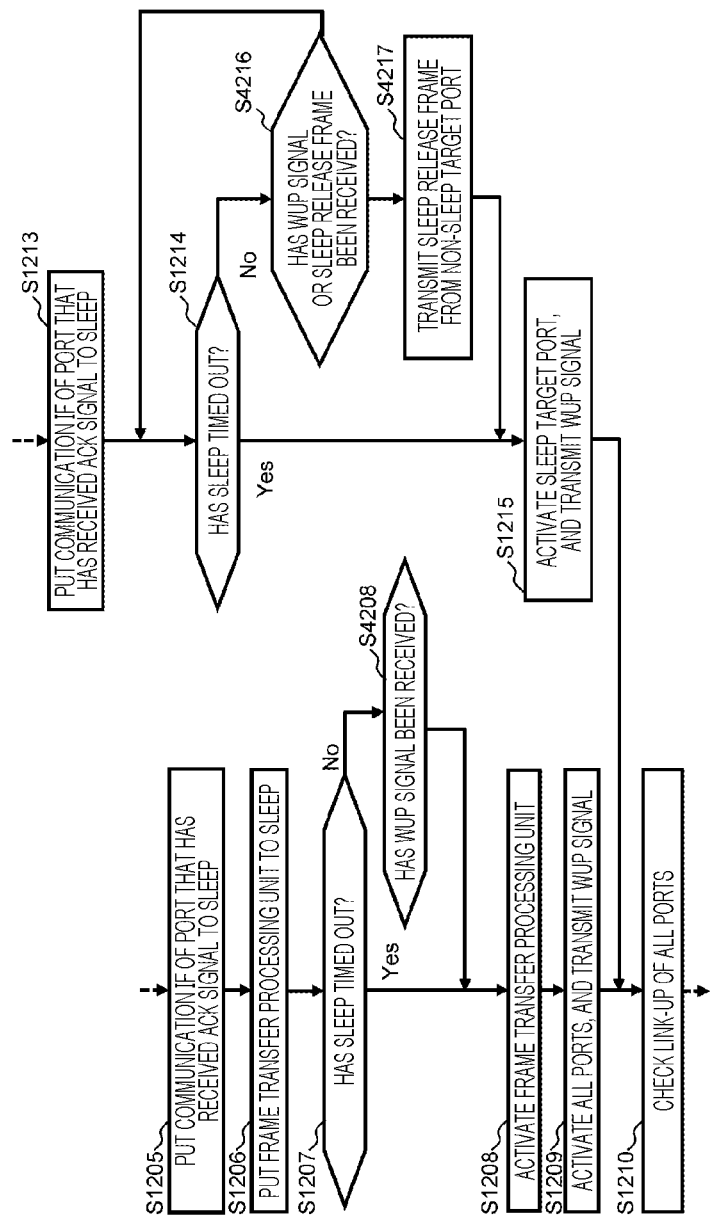
FIG. 17 is a flowchart illustrating the processing of the sleep control unit 3011 in the fourth embodiment.

FIG. 17 is a flowchart illustrating the processing of the sleep control unit 3011 in the fourth embodiment. The difference from the flowchart of FIG. 8 illustrated in the first embodiment is that S4208 is executed when a negative determination is made in S1207, and S4216 and S4217 are executed when a negative determination is made in S1214. The description and illustration of the same process as that of the first embodiment will be omitted.

When the sleep control unit 3011 puts all the ports to sleep in S1206, the sleep control unit 3011 determines whether a sleep timeout has occurred (S1207). If the sleep control unit 3011 determines that it has not timed out, it determines whether the WUP signal has been received (S4208), and if the WUP signal has been received, the process proceeds to S1208, and immediately activates the frame transfer processing unit.

In addition, the sleep control unit 3011 determines whether the sleep timeout has occurred if some ports are put to sleep in S1213 (S1214). If the sleep control unit 3011 determines that it has not timed out, it determines whether the WUP signal or a sleep release frame has been received (S4216), and if either has been received, the process proceeds to S4217 to transmit the sleep release frame from a port that is not a sleep target. The sleep release frame is transmitted to notify other devices connected to the communication interface in the normal state that the sleep state should be released, and to return the entire in-vehicle network to the normal state. Next, the sleep control unit 3011 proceeds to S1215. Subsequent processes are the same as those of the first embodiment, and therefore explanation is omitted.

According to the fourth embodiment, the following operational effects are obtained.

(9) When any of the devices is in the low power state, the sleep instruction control unit 5013 outputs the WUP signal to the gateway device 30 that is not in the low power state when detecting a trigger to an operation mode in which the device is not in the power saving state. The gateway device 30 and the sensor device 10 end the low power state when receiving the WUP signal. When the gateway device 30 receives the sleep release instruction frame, it can start the device without waiting for the sleep end time, and also the WUP signal or the sleep release frame can be transmitted to another device to propagate the sleep release instruction.

Fifth Embodiment

A fifth embodiment of the in-vehicle network system S will be described with reference to FIG. 18. In the following description, the same components as those in the first embodiment are denoted by the same reference numerals, and differences will be mainly described. The points that are not particularly described are the same as in the first embodiment.

In the first embodiment, the operation mode has been set at a constant cycle. Therefore, the length of time that each operation mode continues is the same. However, considering the time when each device actually transitions to the sleep state after the ECU device 50 transmits the sleep instruction frame and the time when each device transitions from the sleep state to the normal state, the operation mode in the power state is preferably longer than the operation mode in the non-low power state in order to enhance the effect of reducing the power consumption. Therefore, in the fifth embodiment, the length of the sleep period specified by the sleep instruction frame is set based on the newly set operation mode. In the following, the third embodiment will be described focusing on the differences from the first embodiment. The main difference is the operation of the sleep instruction control.

(Flowchart of Sleep Instruction Control Unit 5013)

Figure 18:
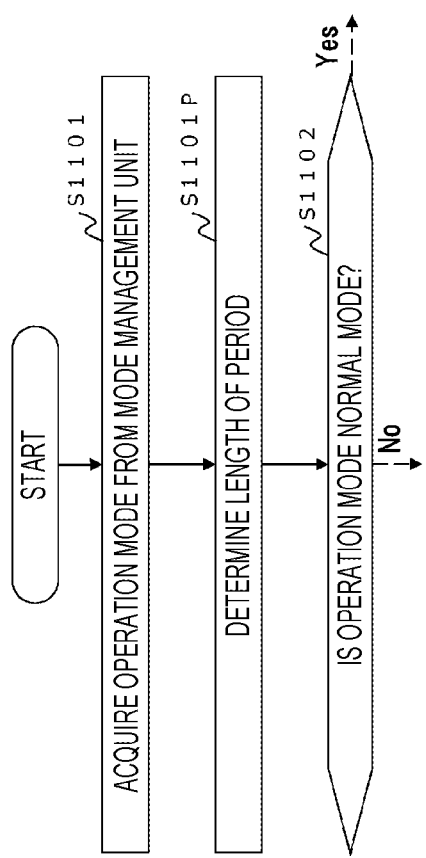
FIG. 18 is a flowchart illustrating the operation of the sleep instruction control unit 5013 in a fifth embodiment.

FIG. 18 is a flowchart illustrating the operation of the sleep instruction control unit 5013 in the fifth embodiment. The difference from the first embodiment is that after acquiring the operation mode in S1101, the length of the period of the next operation mode is determined (S1101P), and then the process proceeds to S1102. In determining the length of the period in S1101P, for example, the sleep instruction control unit 5013 refers to a table (not illustrated), and the length of the period for each predetermined operation mode is adopted. Since the sleep instruction control unit 5013 determines the sleep period based on the length of the period of the operation mode to be executed next, it can be said that the sleep instruction control unit 5013 determines the length of time to transition to the low power state for each operation mode.

According to the fifth embodiment, the following operational effects are obtained.

(10) The sleep instruction control unit 5013 determines the length of time for which the gateway device 30 transitions to the low power state based on the operation mode determined by the mode management unit 5011. Therefore, the effect of reducing power consumption can be enhanced.

Sixth Embodiment

A sixth embodiment of the in-vehicle network system S will be described with reference to FIG. 19. In the following description, the same components as those in the first embodiment are denoted by the same reference numerals, and differences will be mainly described. The points that are not particularly described are the same as in the first embodiment.

In the first embodiment, even if the sensor device 10 or the ECU device 50 connected to a certain gateway device 30 is the non-use target in a certain operation mode, the following problems occur when communication relay is required. That is, since the gateway device 30 needs to continue the operation of the frame transfer processing unit 302, the frame transfer processing unit 302 cannot be stopped, which hinders further power consumption reduction. Therefore, in the sixth embodiment, when the operation mode is changed, the power consumption is further reduced by changing the communication route between the sensor device 10 and the ECU device 50.

(Flowchart of Sleep Instruction Control Unit 5013)

Figure 19:
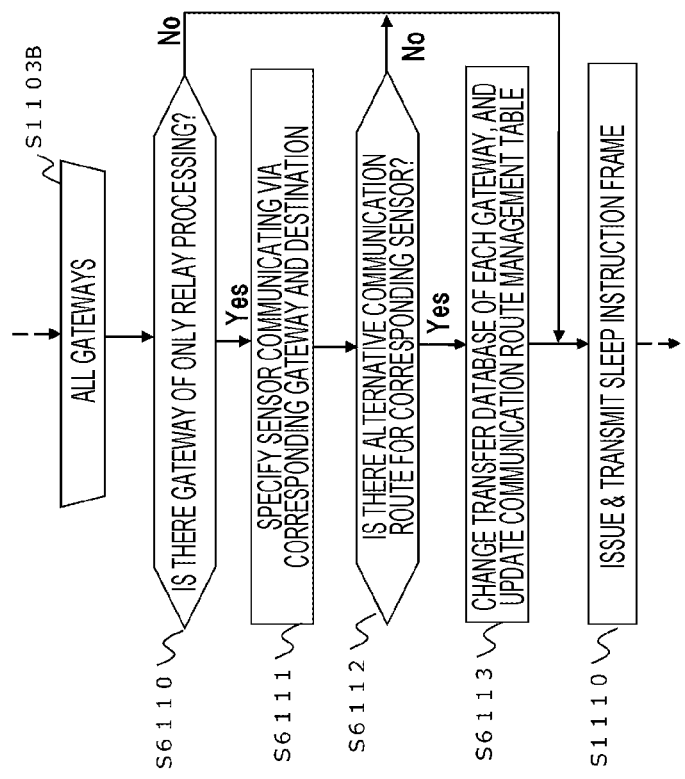
FIG. 19 is a flowchart illustrating the operation of the sleep instruction control unit 5013 in a sixth embodiment.

FIG. 19 is a flowchart illustrating the operation of the sleep instruction control unit 5013 in the sixth embodiment. The description and illustration of the same process as that of the first embodiment will be omitted. The following processes are added between S1103B and S1110 in the first embodiment. After S1103B, the sleep instruction control unit 5013 determines whether there is a gateway device 30 that performs only the relay process (S6110). The gateway device 30 that performs only the relay process is the gateway device 30 that relays the communication of the other gateway device 30, although the connected sensor device 10 and ECU device 50 are the non-use target in the next operation mode.

The sleep instruction control unit 5013 proceeds to S6111 when making a positive determination in S6110, and proceeds to S1110 when making a negative determination. In S6111, the sleep instruction control unit 5013 specifies a sensor that communicates via the corresponding gateway device 30 and its destination (S6111). Next, the sleep instruction control unit 5013 determines whether there is an alternative communication route that does not pass through the gateway between the corresponding sensor and the destination (S6112). However, whether there is an alternative communication route considers a communication band instead of simply determining whether there is a path. If the sleep instruction control unit 5013 determines that the alternative communication route does not exist, the process proceeds to Step S1110, and if it determines that the alternative path exists, the process proceeds to Step S6113.

In S6113, the sleep instruction control unit 5013 determines the change contents of the transfer database built in the gateway device 30 so as to use the alternative communication route determined to exist in S6112. Then, the sleep instruction control unit 5013 transmits a change instruction of the transfer database to the corresponding gateway device 30 (S6113). In response to this, the sleep instruction control unit 5013 updates the communication route management table managed by each ECU device 50, and proceeds to S1110. The processes after S1110 are the same as those of the first embodiment, and therefore explanation is omitted.

(Operation of Communication Management Unit 3012)

The communication management unit 3012 of the sixth embodiment performs the following operation in addition to the operation of the first embodiment. That is, when the communication management unit 3012 receives a control frame indicating the transfer database change instruction from the sleep instruction control unit 5013, the communication management unit 3012 changes the transfer database of the gateway stored in the gateway device 30 according to the instruction.

According to the sixth embodiment, the following operational effects are obtained.

(11) The sensor device 10 and the ECU device 50 are redundantly wired so that there are a plurality of connecting paths. The sleep instruction control unit 5013 sets the communication route between the sensor device 10 and the ECU device 50 so that the gateway device 30 having no need to relay the sensor information does not need to relay the communication with the other gateway device 30. Therefore, it is possible to change the communication route so as to eliminate the gateway device 30 that performs only the relay process, and to determine the sleep target when the changed communication route is set.

Seventh Embodiment

A seventh embodiment of the in-vehicle network system S will be described with reference to FIGS. 20 and 21. In the following description, the same components as those in the first embodiment are denoted by the same reference numerals, and differences will be mainly described. The points that are not particularly described are the same as in the first embodiment.

In the first embodiment, the sensor device 10 has been connected to the single gateway device 30. However, in order to increase the reliability of the in-vehicle network, each sensor device 10 is connected to a plurality of gateway devices 30 in the seventh embodiment. With this configuration, the sensor device 10 can transmit the ambient information to the ECU device 50 via another gateway device 30 even if a certain gateway device 30 fails. In the following, the seventh embodiment will be described focusing on the differences from the first embodiment. The main differences are the configuration of the in-vehicle network system and the operation of sleep instruction control.
(Configuration of In-Vehicle Network)

Figure 20:
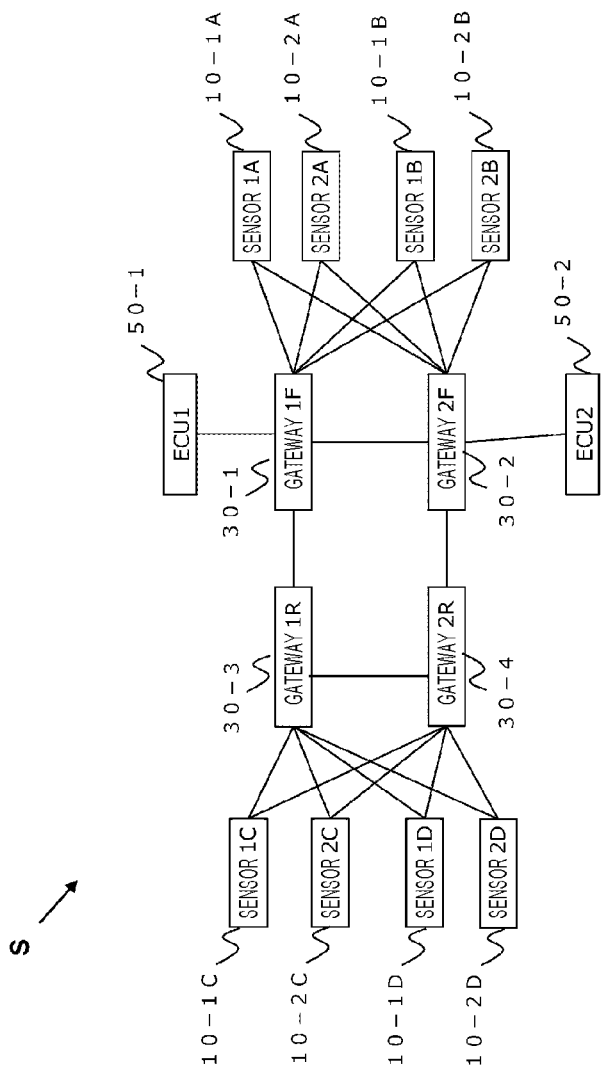
FIG. 20 is a configuration diagram of an in-vehicle network system S according to a seventh embodiment.

FIG. 20 is a configuration diagram of the in-vehicle network system S according to the seventh embodiment. The difference from FIG. 1 in the first embodiment is that each sensor device 10 is connected to two gateway devices 30. For example, the sensor 1C is connected to the gateway 1R and the gateway 2R. Therefore, even if one of the gateway devices 30 fails, it is possible to maintain communication between the sensor and the ECU.
(Configuration of Sensor Device 10)

In the first embodiment, the sensor device 10 includes only one communication IF 105, but in the seventh embodiment, the sensor device 10 includes two communication IFs 105.
(Operation of Sensor Device 10)

The sensor device 10 according to the seventh embodiment performs the following operation in addition to the operation in the first embodiment. The sensor device 10 receives, from the ECU device 50, a transmission port instruction frame including a transmission port for outputting the ambient information and period information for changing the transmission port. Then, the transmission port instruction frame is analyzed to specify the transmission port, and the ambient information is output from the designated transmission port.

When the sensor device 10 receives the transmission port instruction frame, the frame is input to the management unit 1012 of the control unit 101. The management unit 1012 analyzes the input transmission port instruction frame, and acquires the transmission port for outputting the ambient information and the period for changing the transmission port. Then, when the designated period comes, the management unit 1012 outputs a transmission port change instruction to the arithmetic processing unit 102 and the communication IF 105.

The arithmetic processing unit 102 generates a frame including the ambient information based on the signal received from the measurement unit 103, and outputs the frame to the communication IF 105 corresponding to the designated transmission port. The transmission port that outputs the frame including the ambient information may be either one of the two communication IFs 105 or both. When outputting from both ports, the arithmetic processing unit 102 copies the frame and outputs it to the communication IF 105 corresponding to each transmission port. Further, in this case, since the same ambient information is transmitted from the sensor device 10 to the ECU device 50 via two different routes, the ECU device 50 performs further a process of eliminating duplication of frames received from a plurality of routes.
(Flowchart of Sleep Instruction Control Unit 5013)

Figure 21:
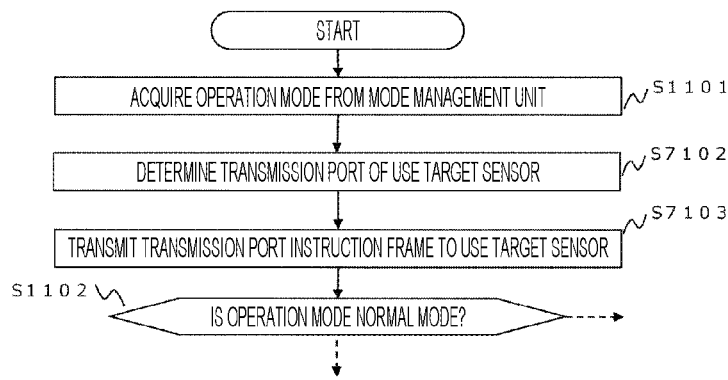
FIG. 21 is a flowchart illustrating the operation of the sleep instruction control unit 5013 in the seventh embodiment.

FIG. 21 is a flowchart illustrating the operation of the sleep instruction control unit 5013 in the seventh embodiment. The sleep instruction control unit 5013 acquires the operation mode (S1101) and determines the transmission port of the use target sensor (S7101). For example, the transmission port of the sensor 1C is set to both the gateway 1R and the gateway 2R in mode 0, and only the gateway 1R in mode 1. When determining the transmission port, the sleep instruction control unit 5013 issues a transmission port instruction frame and transmits the control frame to the use target sensor (S7103). The sleep instruction control unit 5013 next proceeds to S1102, and thereafter, the same processing as in the first embodiment is performed.

However, the sleep instruction control unit 5013 does not consider all the connected sensor devices 10 in the determination of S1104, but considers only the sensor device 10 that transmits the ambient information to the gateway device 30 in the operation mode. Therefore, even when the sensor device 10 is connected to the plurality of gateway devices 30, the gateway device 30 can transition to the sleep state.

For example, in mode 1, when the sensors 1C and 1D output only to the gateway 1R, the gateway 2R can determine that all the connected sensor devices 10 are the non-use targets for the following reason. First, the sensor 2C and the sensor 2D are the non-use targets used in mode 1. In mode 1, the sensors 1C and 1D are not considered because they output the ambient information only to the gateway 1R but not to the gateway 2R according to an instruction from the sleep instruction control unit 5013. Therefore, the gateway 2R can determine that all the connected sensor devices 10 are the non-use targets.

According to the seventh embodiment, the following operational effects are obtained.

(12) The sensor device 10 is directly connected to two or more gateway devices 30, and the sleep instruction control unit 5013 specifies a transmission destination of the ambient information to the sensor device 10 based on the operation mode determined by the mode management unit 5011.

Further, in this embodiment, only the sensor device 10 that transmits the ambient information to the gateway device 30 in the target operation mode is considered. Even when the sensor device 10 is connected to the plurality of gateway devices 30, the gateway device 30 can transition to the sleep state. As a result, it is possible to achieve both the redundancy of the communication route and the reduction of power consumption.

Modification of Seventh Embodiment

In the seventh embodiment, the case where there is a plurality of communication routes between the sensor device 10 and the gateway device 30 has been described. As a similar form, the sensor device 10 is not connected as one gateway device 30 as in the first embodiment, but it is conceivable that the gateway devices 30 are connected so as to have redundancy. At this time, a certain gateway device 30 copies the frame received from the sensor device 10, and transmits the frame to the ECU device 50 via different routes.

At this time, when the operation mode is set to mode 1, the gateway 2R always receives not only the ambient information of the sensor devices 10 of the second group but also the ambient information of the sensor devices 10 of the first group from the adjacent gateway device 30. Therefore, the sleep state cannot be entered. In this case, the sleep instruction control unit 5013 transmits the transmission port instruction frame to the gateway device 30 so that the gateway device 30 outputs the transmission port instruction frame only to one of the routes. By doing so, for example, when setting to mode 1, the gateway 2R does not receive the ambient information of the first group from the adjacent gateway device 30, so that the gateway 2R can transition to the sleep state.

Eighth Embodiment

An eighth embodiment of the in-vehicle network system S will be described with reference to FIG. 22. In the following description, the same components as those in the first embodiment are denoted by the same reference numerals, and differences will be mainly described. The points that are not particularly described are the same as in the first embodiment. In the following, the eighth embodiment will be described focusing on the differences from the first embodiment. The main difference is the functional configuration of the gateway device.

In the first embodiment, since one physical gateway device 30 functions as it is as one gateway device 30, so to speak, one physical gateway device 30 has functioned as one logical gateway device. In the eighth embodiment, one physical gateway device 30 functions as two logical gateway devices. However, one physical gateway device 30 may function as three or more logical gateway devices. In this embodiment, the gateway 1R and the gateway 2R in the first embodiment are realized by a single gateway device 30, and the gateway 1F and the gateway 2F are realized by another single gateway device 30.

(Configuration of Gateway Device 30)

Figure 22:
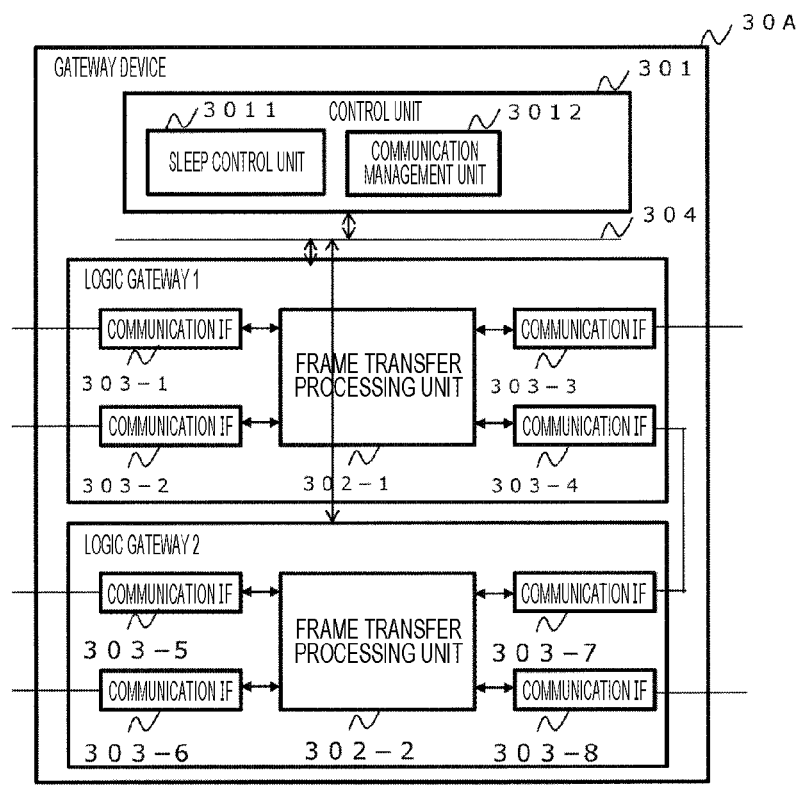
FIG. 22 is a functional configuration diagram of a gateway device 30A according to an eighth embodiment.

FIG. 22 is a functional configuration diagram of a gateway device 30A according to the eighth embodiment. The gateway device 30A includes a control unit 301, a first logical gateway 30A-1, and a second logical gateway 30A-2. Each logical gateway includes a communication IF 303 and a frame transfer processing unit 302. Further, the communication IF 303-4 and the communication IF 303-7 are connected to each other for communication between the first logical gateway 30A-1 and the second logical gateway 30A-2.

Each communication IF 303 of the first logical gateway 30A-1, the frame transfer processing unit 302-1 of the first logical gateway 30A-1, each communication IF 303 of the second logical gateway 30A-2, and the frame transfer processing unit 302-2 of the second logical gateway 30A-2 can transition to the sleep state independently. Therefore, the transition of the communication IF 303 and the frame transfer processing unit 302 of the gateway device 30 according to the first embodiment to the sleep state corresponds to the transition the entire logical gateway of any one of the gateway devices 30A in the eighth embodiment to the sleep state. The power consumption can be reduced in the eighth embodiment as in the first embodiment. Further, when the sleep instruction frame is received from the ECU 1, the sleep control unit 3011 of the control unit 301 receives the sleep instruction frame as in the first embodiment, and the processing is performed according to the instruction.

According to the eighth embodiment, the following operational effects are obtained.

(13) Two or more gateway devices 30 included in the plurality of gateway devices 30 are logically configured and realized by one hardware device. According to the eighth embodiment, even when a plurality of logical gateway devices are configured in one physical gateway device 30A, the logical gateway to which the sensor device 10 and the ECU device 50 to be used in the specific operation mode are connected can transition to the sleep state. Also, even if the grouping of each sensor is changed by rewriting a program or logic circuit that realizes the logical gateway, it is possible to change the logical gateway to which each sensor is connected without changing the cable connection between the sensor and the gateway.

First Modification of Eighth Embodiment

The communication IF 303 of the gateway device 30A may be provided with a wiring switching unit capable of dynamically switching wiring. This wiring switching unit can dynamically change the correspondence between input and output based on a manual switch or an instruction from the control unit 301. According to this modification, the connection destination can be easily changed, and the logical gateway can easily transition to the sleep state according to the situation.

Second Modification of Eighth Embodiment

The logical gateway of the eighth embodiment may be configured by a dynamically rewritable logic circuit, for example, FPGA (Field Programmable Gate Array). According to this modification, the function of switching the connection destination can be incorporated in the logic circuit.

The above-described embodiments and modifications may be combined with each other. Various embodiments and modifications have been described, but the invention is not limited to these contents. Other aspects which are conceivable within a scope of technical ideas of the invention may be made within the scope of the invention.

The disclosure of the following basic priority applications is incorporated herein by reference.

Japanese Patent Application No. 2018-14801 (filed on Jan. 31, 2018)

REFERENCE SIGNS LIST 10 sensor device
30 gateway device
50 ECU device
100 vehicle
101 control unit
102 arithmetic processing unit
103 measurement unit
104 internal bus
105 communication interface
301 control unit
302 frame transfer processing unit
501 control unit
502 arithmetic processing unit
1011 sleep control unit
1012 management unit
3011 sleep control unit
3012 communication management unit
5011 mode management unit
5012 communication management unit
5013 sleep instruction control unit

The invention claimed is:

1. An in-vehicle network system which is mounted on a vehicle, comprising:
   an electronic control unit;
   a plurality of gateway devices; and
   a plurality of sensors that collect ambient information, which is information around the vehicle,
   wherein each of the sensors communicates with the electronic control unit via at least one of the plurality of gateway devices,
   the electronic control unit includes:
      a mode management unit that determines a first operation mode in a plurality of operation modes associated with a first sensor of the plurality of sensors to be operated, and
      a sleep instruction control unit that:
   specifies an operation mode of a first gateway device, which is directly connected to the first sensor, in which the first sensor does not operate, and in which the first gateway device does not need to relay information from the first sensor, based on the first operation mode, and
   transitions the first gateway device to a low power state in which a processing capacity is lowered, and wherein
   the first gateway device is directly connected to at least one additional sensor, and
   all sensors that are directly connected to the first gateway device do not operate in at least a same one operation mode as other sensors in the in-vehicle network system.

2. The in-vehicle network system according to claim 1, wherein the first gateway device reduces the processing capacity in the low power state according to a number of sensors to which it is connected and which do not require communication.

3. The in-vehicle network system according to claim 1, wherein the sleep instruction control unit stops a communication function of the first gateway device when it is determined that the first gateway device is not required to relay communication with other gateway devices.

4. The in-vehicle network system according to claim 1, wherein the sleep instruction control unit determines a cycle in which a second sensor transmits the ambient information based on an operation mode determined by the mode management unit, and causes the second sensor to transmit the ambient information in the determined cycle.

5. The in-vehicle network system according to claim 1, wherein the sleep instruction control unit determines a number of times a second sensor transmits the ambient information in duplicate based on an operation mode associated with the first sensor, determined by the mode management unit, and causes the second sensor to transmit the ambient information in duplicate the determined number of times.

6. The in-vehicle network system according to claim 1, wherein
   when any device is in the low power state and a trigger to an operation mode in which no device is in a power saving state is detected, the sleep instruction control unit outputs a wake-up signal to the first gateway device, and
   the first gateway device and the first sensor end the low power state when receiving the wake-up signal.

7. The in-vehicle network system according to claim 1, wherein
   the sleep instruction control unit determines a length of time for which a gateway device, having no need to relay information from a sensor, transitions to the low power state based on an operation mode associated with the first sensor determined by the mode management unit.

8. The in-vehicle network system according to claim 1, wherein
   a plurality of routes connecting the first sensor and the electronic control unit are redundantly wired, and
   the sleep instruction control unit sets a communication route between the first sensor and the electronic control unit so that the first gateway device is not required to relay communication with the other gateway devices.

9. The in-vehicle network system according to claim 1, wherein the electronic control unit is a first electronic control unit, and the in-vehicle network system includes:
   a second electronic control unit, wherein
   a first group including the first electronic control unit and the first sensor, and a second group including the second electronic control unit and a second sensor are configured,
   the first sensor is connected to the first electronic control unit via the first gateway device,
   the second sensor is connected to the second electronic control unit via a second gateway device,
   the mode management unit, when detecting a malfunction of the first electronic control unit, determines a operation mode as a first degenerate mode for performing a degenerate operation using the second group, and when detecting a malfunction of the second electronic control unit, determines an operation mode as a second degeneration mode for performing a degenerate operation using the first group, and
   the sleep instruction control unit transitions the first gateway device to a low power state in the first degenerate mode, and transitions the second gateway device to a low power state in the second degenerate mode.

10. The in-vehicle network system according to claim 1, wherein
   The first sensor is directly connected to two or more of the gateway devices of the plurality of gateway devices, and
   the sleep instruction control unit designates a transmission destination of the ambient information to the first sensor based on an operation mode determined by the mode management unit.

11. The in-vehicle network system according to claim 1, wherein two or more gateway devices included in the plurality of gateway devices are logically configured and realized by one hardware device.

12. An electronic control unit that communicates with a plurality of gateway devices and a plurality of sensors that collect ambient information that is information around a vehicle, and is mounted in the vehicle, the electronic control unit comprising:
- a mode management unit that determines one of a plurality of operation modes associated with a first sensor of the plurality of sensors; and
- a sleep instruction control unit that:
- specifies an operation mode of a first gateway device of the plurality of gateway devices in charge of relaying ambient information of the first sensor based on the operation mode determined by the mode management unit, and
- wherein the sleep instruction control unit causes the first gateway device to transition to a low power state in which a processing capacity is lowered when the determined operation mode indicates that the first sensor is not being operated.

\* \* \* \* \*